US012743132B2

(12) United States Patent
Kim et al.

(10) Patent No.: US 12,743,132 B2
(45) Date of Patent: Sep. 22, 2026

(54) DISPLAY DEVICE

(71) Applicant: Samsung Display Co., LTD., Yongin-si (KR)

(72) Inventors: Sungwon Kim, Yongin-si (KR); Kyungrok Ko, Yongin-si (KR); Byoung Jin Jin, Yongin-si (KR); Ji Woong Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 194 days.

(21) Appl. No.: 18/234,523

(22) Filed: Aug. 16, 2023

(65) Prior Publication Data

US 2024/0176396 A1 May 30, 2024

(30) Foreign Application Priority Data

Nov. 29, 2022 (KR) ........................ 10-2022-0163050

(51) Int. Cl.
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1652* (2013.01); *H04M 1/0216* (2013.01); *H04M 1/0268* (2013.01)

(58) Field of Classification Search
CPC .... G06F 1/1656; G06F 1/1616; G06F 1/1652; G06F 1/16; G06F 9/301; B32B 37/0046; B32B 37/10; B32B 37/0007; B32B 37/003; B32B 37/12; B32B 37/26
See application file for complete search history.

(56) References Cited

U.S. PATENT DOCUMENTS

| | | | | |
|---|---|---|---|---|
| 10,194,543 | B2 | 1/2019 | Seo et al. | |
| 10,963,014 | B1 * | 3/2021 | Park | G06F 1/1652 |
| 11,194,363 | B2 | 12/2021 | Kim et al. | |
| 11,800,659 | B2 | 10/2023 | Yoon | |
| 2018/0103552 | A1 * | 4/2018 | Seo | G09F 9/301 |
| 2019/0305237 | A1 * | 10/2019 | Shin | G06F 3/041 |
| 2019/0334114 | A1 * | 10/2019 | Park | H05K 5/0226 |
| 2020/0313112 | A1 * | 10/2020 | Lee | G09F 9/301 |
| 2020/0314225 | A1 * | 10/2020 | Ahn | H04M 1/0268 |
| 2021/0200273 | A1 * | 7/2021 | Hong | H04M 1/0268 |
| 2022/0171434 | A1 | 6/2022 | Park et al. | |
| 2023/0007796 | A1 * | 1/2023 | Ahn | C09J 9/00 |
| 2023/0034440 | A1 * | 2/2023 | Xie | G09F 9/301 |

(Continued)

FOREIGN PATENT DOCUMENTS

| | | |
|---|---|---|
| KR | 20180040181 A | 4/2018 |
| KR | 20210031348 A | 3/2021 |

(Continued)

*Primary Examiner* — Abhishek M Rathod
(74) *Attorney, Agent, or Firm* — CANTOR COLBURN LLP

(57) ABSTRACT

A display device includes a display module and a support plate disposed under the display module. The support plate includes a flat portion, a flexible portion that extends from the flat portion and that is folded such that a portion is disposed under the flat portion, and a plurality of protruding bars that protrude downward from the flexible portion, and a plurality of grooves is defined in an upper surface of the flexible portion and overlaps the plurality of protruding bars.

18 Claims, 30 Drawing Sheets

(56) References Cited

U.S. PATENT DOCUMENTS

| | | | | |
|---|---|---|---|---|
| 2023/0085742 | A1* | 3/2023 | Yang | G06F 1/1616 361/679.01 |
| 2023/0164248 | A1 | 5/2023 | Park et al. | |
| 2023/0164931 | A1* | 5/2023 | Wang | G06F 1/1624 361/807 |
| 2024/0206281 | A1* | 6/2024 | Zhang | H10K 59/871 |

FOREIGN PATENT DOCUMENTS

| | | | |
|---|---|---|---|
| KR | 20220014806 | A | 2/2022 |
| KR | 102389189 | B1 | 4/2022 |
| KR | 1020220059051 | A | 5/2022 |
| KR | 1020220061798 | A | 5/2022 |
| KR | 20220076959 | A | 6/2022 |
| KR | 1020220091330 | A | 6/2022 |
| KR | 1020220130165 | A | 9/2022 |

* cited by examiner

FIG. 3

SPT
PRB
GV
FLP
PLT
DR3
DR2
DR1

FIG. 11

DR1
DR2
DR3
PLT
SPT
FLP
PRB
GV

CS1
CS2
CS
DR3
DR2
DR1
RX
BCV
VIII'
BP1
GOP
PRT
CV1
GIR
CRA
GRA
RA2
RA1
VII'
OS
IS1
IS2
BP2
SW1
VII
VI'
SW2
SGV
V
V'
SSP
VI
VIII
FCV
CV2

BCV
BNP
GIR
RX
VIII'
DR3
DR2
DR1
FLP
GV
LKB
PRB
DD
GRA
RA1
RA2
AMP
CS1,CS2
GOP
OP
PLT
BP2
BP1
DM
SPT
SSP
CV1
CV2
SW1
VIII
FCV
CS2

DM
ADH
SPT'
PLT
SB
CVP
DR3
DR1
DR2

SB

PRB

FIG. 31A
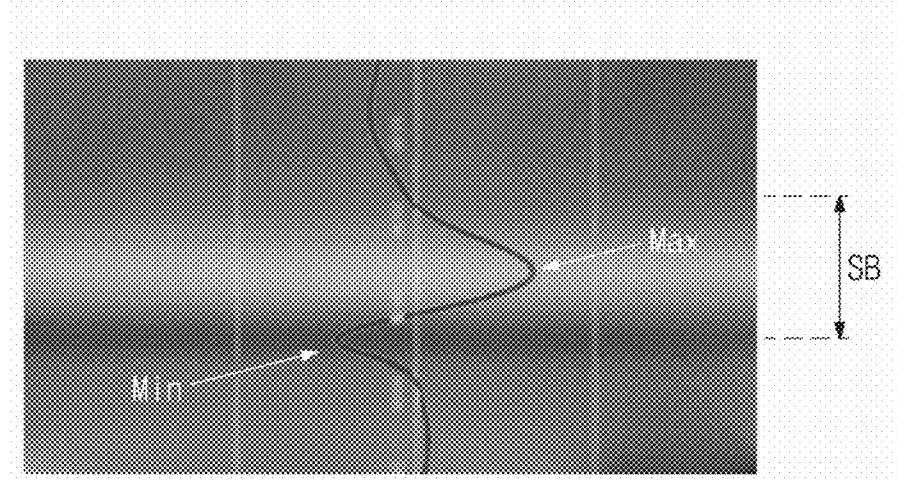
FIG. 31B
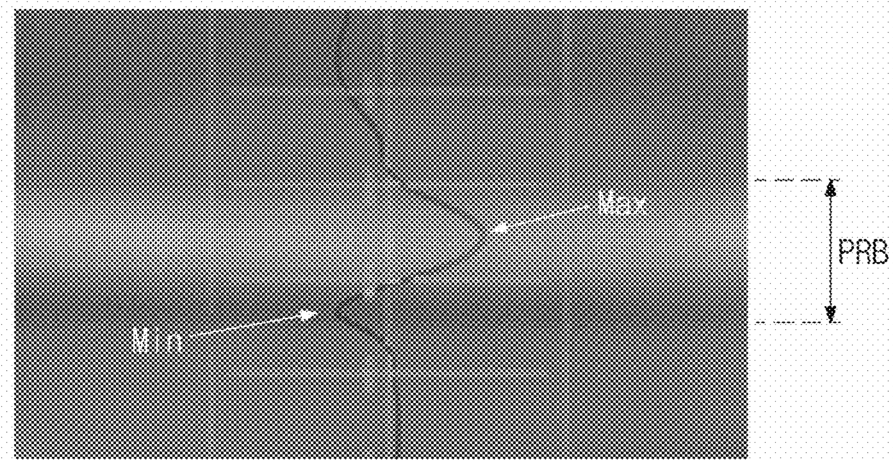

R
B
SB
B

G
B
G
PRB

PT1
PT2
PRB
GV
FLP
OP-1
SPT-3
PLT
DR3
DR2
DR1

PT1
PT2
PRB
GV
FLP
OP-2
SPT-4
PLT
DR3
DR2
DR1

SPT-5
PLT
FLP
GV-3
PRB-3
PRB-3
DR3
DR2
DR1

PRB-4
GV-4
FLP
SPT-6
PLT
DR3
DR2
DR1

DISPLAY DEVICE

This application claims priority to Korean Patent Application No. 10-2022-0163050, filed on Nov. 29, 2022, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

In general, an electronic device, such as a smart phone, a digital camera, a notebook computer, a car navigation device, a smart television, or the like, which provides an image to a user includes a display device for displaying an image. The display device generates an image and provides the generated image to the user through a display screen.

With a development of display device technology, various forms of display devices are being developed. For example, a flexible display device that may be slid or wound to extend outside a case is being developed. The flexible display device that may be deformed in various ways may be easy to carry and may improve user convenience.

The flexible display device includes a flexible display module. The display module is accommodated in the case and is extended by being withdrawn from the case to the outside as desired. A support part for supporting the display module is disposed under the display module. A support part that easily supports the display module and has flexible characteristics together with the display module is desired to be developed.

SUMMARY

Embodiments of the disclosure provide a display device including a support plate that is easily folded together with a display module and is lighter in weight.

In an embodiment, a display device includes a display module and a support plate disposed under the display module. The support plate includes a flat portion, a flexible portion that extends from the flat portion and that is folded such that a portion is disposed under the flat portion, and a plurality of protruding bars that protrude downward from the flexible portion, and a plurality of grooves is defined in an upper surface of the flexible portion and overlaps the plurality of protruding bars.

In an embodiment, a display device includes a display module and a support plate disposed under the display module. The support plate includes a flat portion, a flexible portion that extends from the flat portion and that is folded about a rotational axis extending in a direction such that a portion is disposed under the flat portion, a plurality of protruding bars that protrude downward from the flexible portion and extend in the direction, and a plurality of link bars disposed on opposite sides of the plurality of protruding bars opposite to each other in the direction.

In an embodiment, a display device includes a display module, a support plate disposed under the display module, and a plurality of protruding bars that protrude downward from a portion of the support plate to overlap a plurality of grooves defined in an upper surface of the portion of the support plate, and the plurality of grooves extends into the plurality of protruding bars.

BRIEF DESCRIPTION OF THE DRAWINGS

The above and other embodiments, advantages and features of the disclosure will become apparent by describing in detail embodiments thereof with reference to the accompanying drawings.

FIG. 3 is a plan view of a display module accommodated in a case illustrated in FIG. 1.

FIG. 11 is a view illustrating a rear side of the bent support plate illustrated in FIG. 10.

FIG. 25 illustrates a default mode of the display device illustrated in FIG. 1.

FIG. 26 illustrates the extended mode of the display device illustrated in FIG. 2.

FIG. 31A is a graph depicting a deformed state of the display module when the separate support bars are disposed under the display module.

FIG. 31B is a graph depicting an embodiment of a deformed state of the display module when the protruding bars of the support plate according to the disclosure are disposed under the display module.

DETAILED DESCRIPTION

Figure 1:
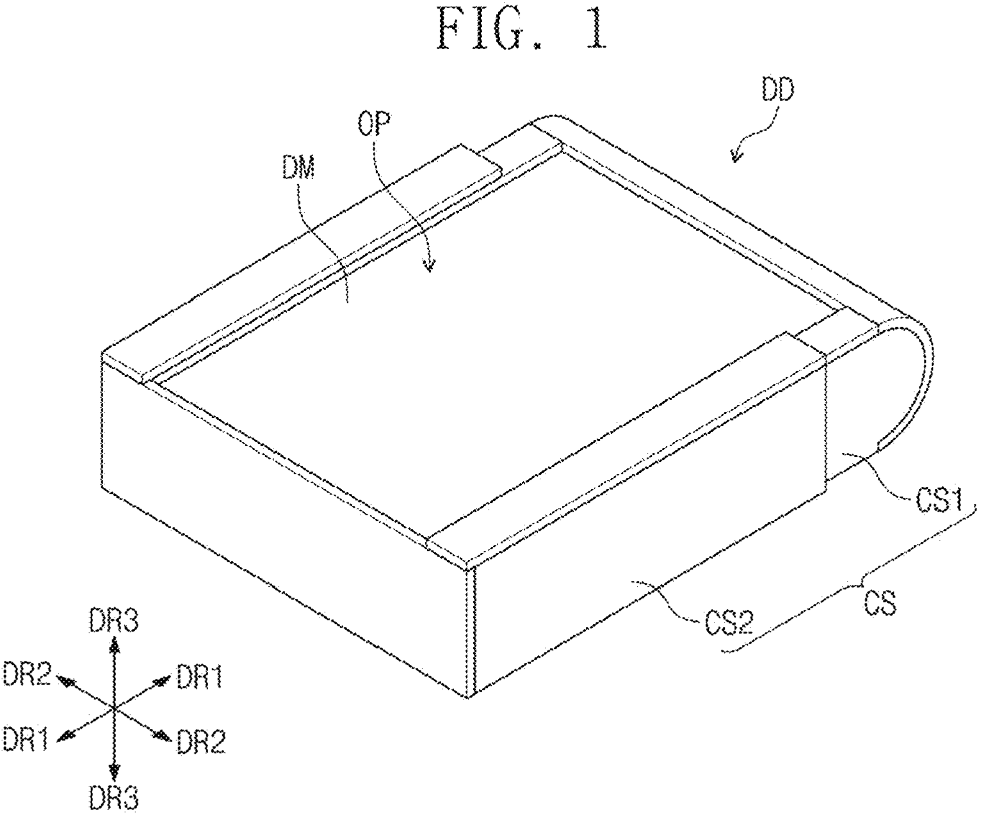
FIG. 1 is a perspective view of an embodiment of a display device according to the disclosure.

In this specification, when it is mentioned that a component (or, a region, a layer, a part, etc.) is referred to as being "on", "connected to" or "coupled to" another component, this means that the component may be directly on, connected to, or coupled to the other component or a third component may be present therebetween.

Identical reference numerals refer to identical components. Additionally, in the drawings, the thicknesses, proportions, and dimensions of components are exaggerated for effective description.

As used herein, the term "and/or" includes all of one or more combinations defined by related components.

Terms such as first, second, and the like may be used to describe various components, but the components should not be limited by the terms. The terms may be used only for distinguishing one component from other components. For example, without departing the scope of the disclosure, a first component may be also referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within +30%, 20%, 10%, 5% of the stated value, for example.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the application.

It should be understood that terms such as "comprise", "include", and "have", when used herein, specify the presence of stated features, numbers, steps, operations, components, parts, or combinations thereof, but do not preclude the presence or addition of one or more other features, numbers, steps, operations, components, parts, or combinations thereof.

Hereinafter, embodiments of the disclosure will be described with reference to the accompanying drawings.

Figure 2:
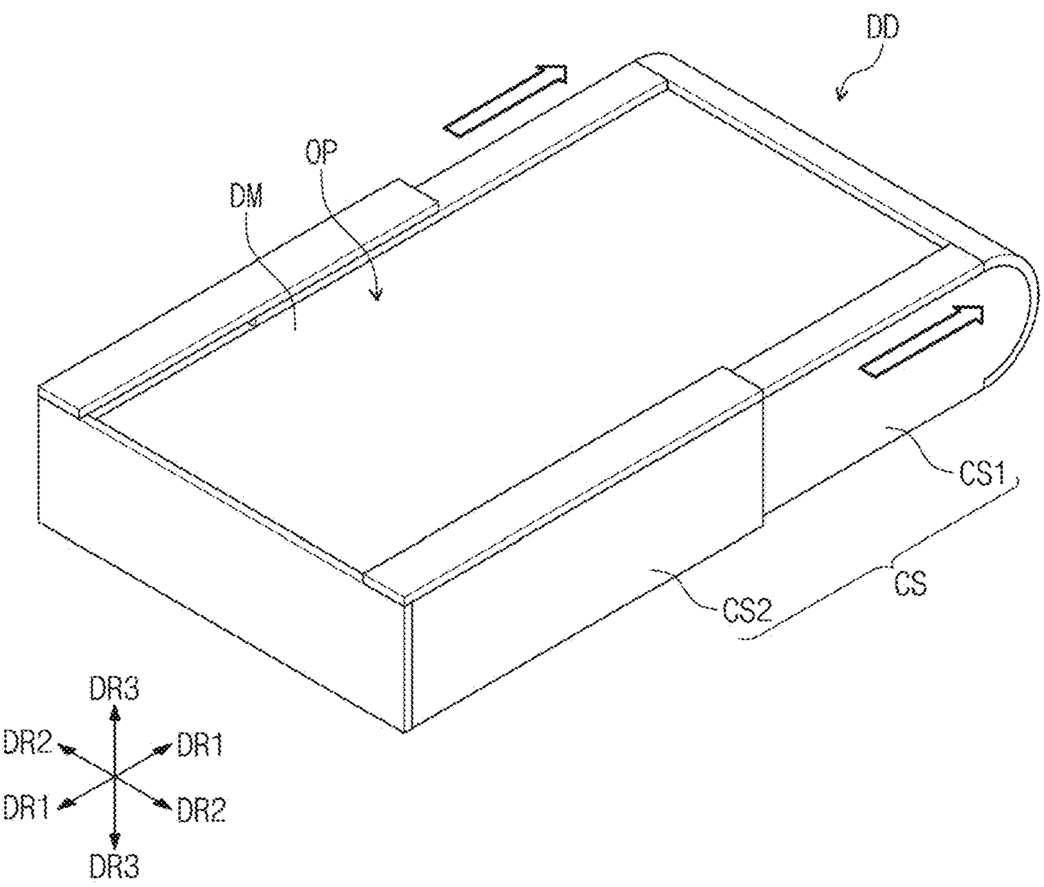
FIG. 2 is a view for describing an extended mode of the display device illustrated in FIG. 1.

FIG. 1 is a perspective view of an embodiment of a display device according to the disclosure. FIG. 2 is a view for describing an extended mode of the display device illustrated in FIG. 1.

Referring to FIG. 1, the display device DD in an embodiment of the disclosure may include a display module DM and a case CS in which the display module DM is accommodated. The display module DM may be exposed to the outside through an opening OP defined in an upper portion of the case CS.

The case CS may include a first case CS1 and a second case CS2 that are coupled with each other and in which the display module DM is accommodated. The first case CS1 may be coupled to the second case CS2 to move in a first direction DR1.

Hereinafter, a direction crossing the first direction DR1 is defined as a second direction DR2. A direction substantially vertically crossing a plane defined by the first and second directions DR1 and DR2 is defined as a third direction DR3. As used herein, the expression "the plan view" may mean that a view in the third direction DR3.

More detailed configurations of the first and second cases CS1 and CS2 will be described below in detail with reference to an exploded perspective view of the case CS illustrated in FIG. 18.

Referring to FIGS. 1 and 2, the first case CS1 may move toward or away from the second case CS2 in the first direction DR1. When the first case CS1 moves in the first direction DR1, the area of an exposed surface of the display module DM may be adjusted depending on the movement of the first case CS1.

The display module DM may be a flexible display module and may be supported by a support plate (SPT illustrated in FIG. 9) disposed under the display module DM. A detailed structure of the support plate will be described below in detail with reference to FIG. 9.

The display module DM and the support plate may be accommodated in the first case CS1 and the second case CS2. The display module DM and the support plate may be connected to the second case CS2, and when the first case CS1 moves from the second case CS2 in the first direction DR1, the display module DM and the support plate may also move in the first direction DR1.

Although not illustrated, in addition to a portion of the display module DM exposed through the opening OP, a portion of the display module DM not exposed to the outside may be disposed in the first case CS1.

Referring to FIG. 2, the first case CS1 may move away from the second case CS2 in the first direction DR1. The display module DM may move in the first direction DR1 depending on the movement of the first case CS1, and thus the exposed surface of the display module DM may be extended. As the exposed surface of the display module DM is extended, a user may visually recognize an image through a wider screen. The state of the display device DD in which the exposed surface of the display module DM is extended may be defined as the extended mode.

Referring to FIG. 1, the first case CS1 may toward the second case CS2 in the first direction DR1. When the first case CS1 moves toward the second case CS2 to the maximum, the exposed surface of the display module DM may be set to a minimum. The state of the display device DD may be defined as a default mode. Both the default mode and the extended mode of the display device DD may be implemented depending on the movement of the first case CS1.

Figure 3:
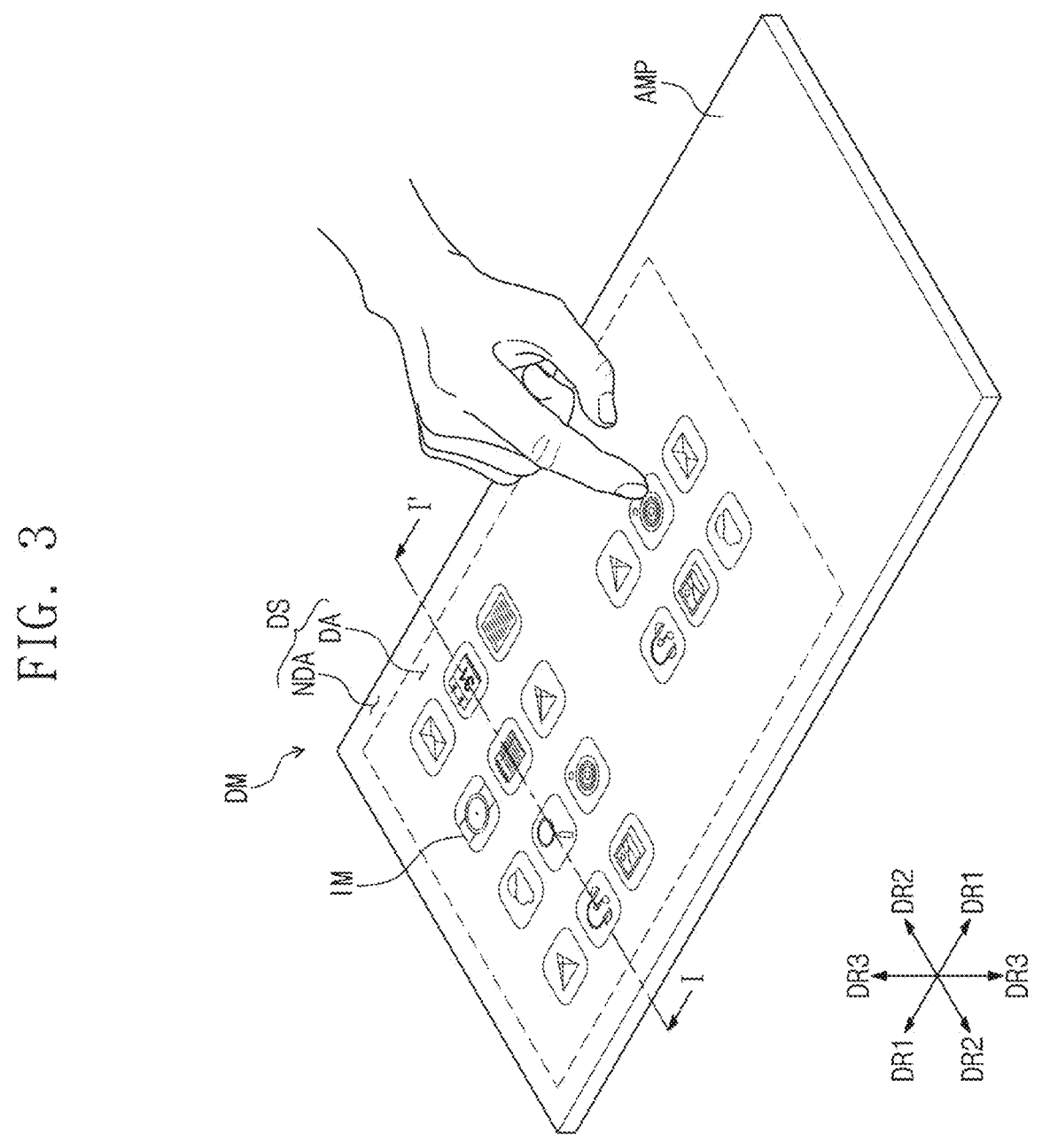
Figure 4:
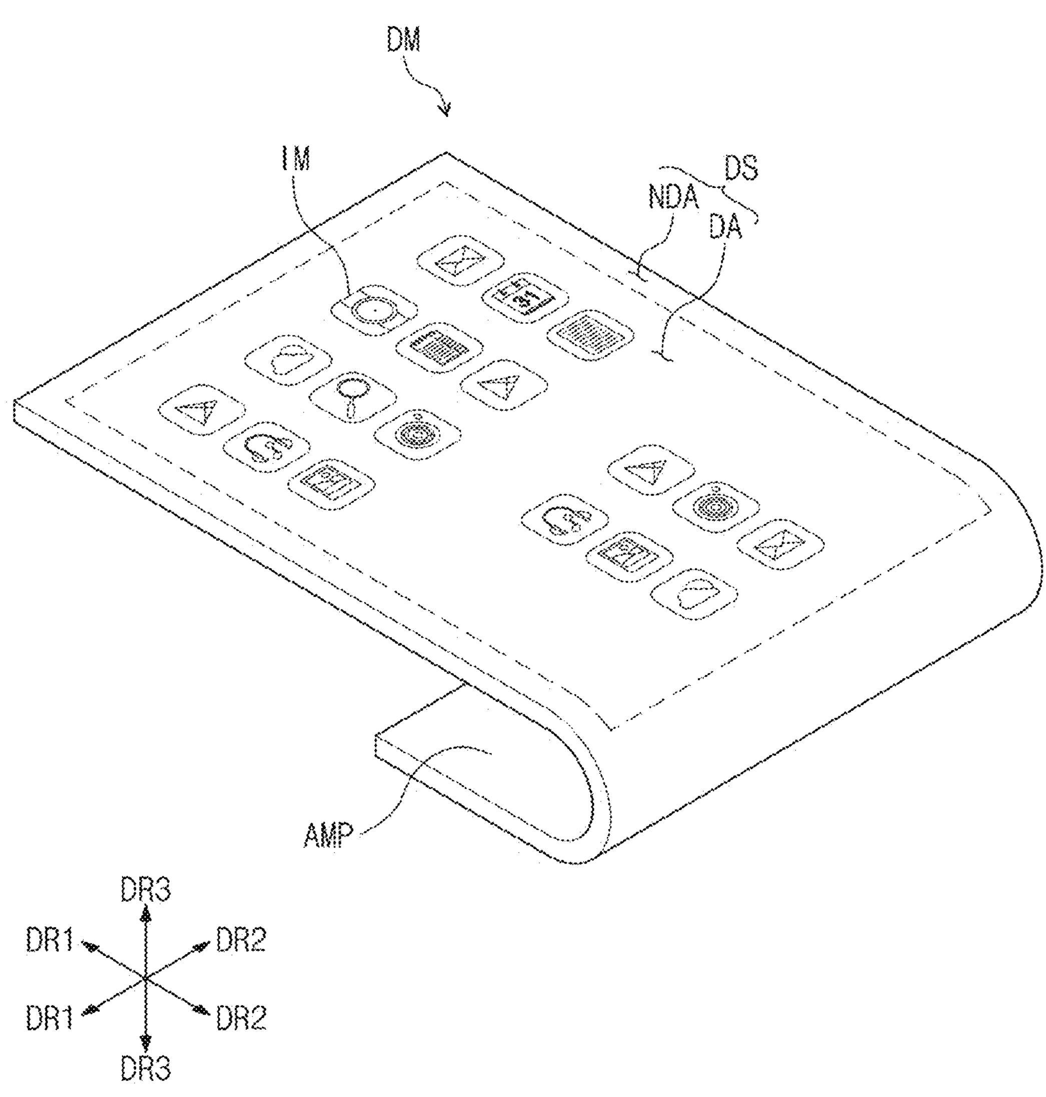
FIG. 4 is a view illustrating a folded state of the display module illustrated in FIG. 3.

FIG. 3 is a plan view of the display module accommodated in the case illustrated in FIG. 1. FIG. 4 is a view illustrating a folded state of the display module illustrated in FIG. 3.

Referring to FIG. 3, the display module DM may have a quadrangular, shape e.g., rectangular shape with long sides extending in the first direction DR1 and short sides extending in the second direction DR2. However, without being limited thereto, the display module DM may have various shapes such as a circular shape, a polygonal shape, or the like.

An upper surface of the display module DM may be defined as a display surface DS and may have a plane defined by the first direction DR1 and the second direction DR2. Images IM generated by the display module DM may be provided to the user through the display surface DS.

The display surface DS may include a display region DA and a non-display region NDA around the display region DA. The display region DA may display an image, and the non-display region NDA may not display an image. The non-display region NDA may surround the display region DA and may define a border of the display module DM that is printed in a predetermined color.

The display module DM may sense an input applied from the outside. In an embodiment, the display module DM may sense a touch of the user as an external input and may display an image corresponding to a sensed signal, for example.

The display module DM may include an accommodated portion AMP adjacent to the display region DA. The accommodated portion AMP may be adjacent to one side of the display module DM in the first direction DR1. The accommodated portion AMP may be substantially the non-display region NDA. The accommodated portion AMP may be defined as the non-display region NDA adjacent to the one side of the display module DM.

The accommodated portion AMP may have a larger area than the non-display regions NDA adjacent to opposite sides of the display module DM opposite to each other in the second direction DR2 and the non-display region NDA adjacent to an opposite side of the display module DM in the first direction DR1.

Referring to FIGS. 1 and 4, the display module DM may be a flexible display module. The display module DM may be folded and accommodated in the case CS. The display region DA of the display module DM may be exposed to the outside. The area of the display region DA exposed to the outside may be adjusted depending on the movement of the second case CS2.

When the display module DM is folded, the accommodated portion AMP may be disposed under the display region DA. The accommodated portion AMP may be accommodated in the case CS and may not be exposed to the outside. A driver for driving elements of the display module DM may be disposed on the accommodated portion AMP.

Figure 5:
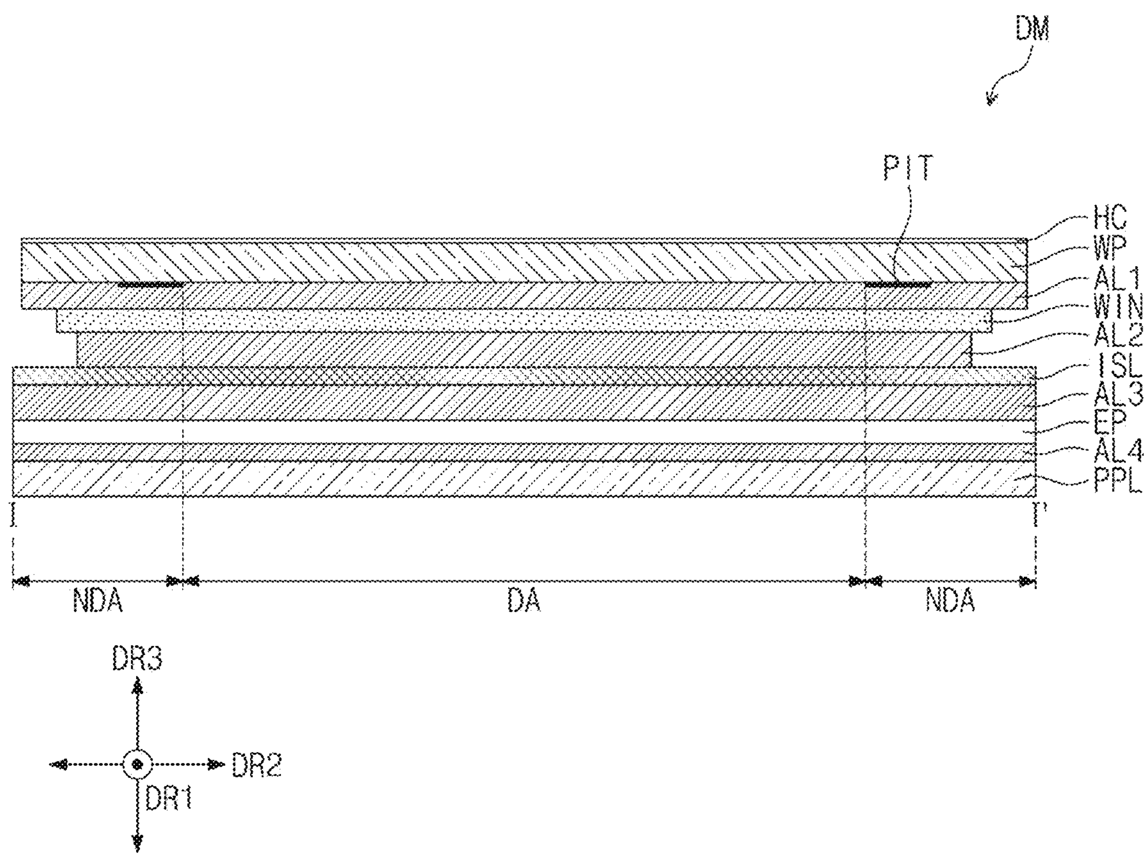
FIG. 5 is a cross-sectional view taken along line I-I' illustrated in FIG. 3.

FIG. 5 is a cross-sectional view taken along line I-I' illustrated in FIG. 3.

Referring to FIG. 5, the display module DM may include an electronic panel EP, an impact absorbing layer ISL, a panel protection layer PPL, a window WIN, a window protection layer WP, a hard coating layer HC, and first to fourth adhesive layers AL1 to AL4.

The electronic panel EP may display an image. The electronic panel EP may include a display panel, an input sensing part, and an anti-reflection layer, and the configuration of the electronic panel EP will be described below with reference to FIG. 6.

The impact absorbing layer ISL may be disposed on the electronic panel EP. The impact absorbing layer ISL may protect the electronic panel EP by absorbing an external impact applied toward the electronic panel EP from above the display device DD. The impact absorbing layer ISL may be manufactured in the form of a stretchable film.

The impact absorbing layer ISL may include a flexible plastic material. The flexible plastic material may be defined as a synthetic resin film. In an embodiment, the impact absorbing layer ISL may include a flexible plastic material such as polyimide ("PI") or polyethylene terephthalate ("PET"), for example.

The window WIN may be disposed on the impact absorbing layer ISL. The window WIN may protect the electronic panel EP from external scratches. The window WIN may have a property of being optically transparent. The window WIN may include glass. However, without being limited thereto, the window WIN may include a synthetic resin film.

The window protection layer WP may be disposed on the window WIN. The window protection layer WP may include a flexible plastic material such as polyimide or polyethylene terephthalate. The hard coating layer HC may be disposed on an upper surface of the window protection layer WP.

A printed layer PIT may be disposed on a lower surface of the window protection layer WP. The printed layer PIT may be black in color, but the color of the printed layer PIT is not limited thereto. The printed layer PIT may be adjacent to the periphery of the window protection layer WP. The printed layer PIT may overlap the non-display region NDA.

The panel protection layer PPL may be disposed under the electronic panel EP. The panel protection layer PPL may protect a lower portion of the electronic panel EP. The panel protection layer PPL may include a flexible plastic material. In an embodiment, the panel protection layer PPL may include polyimide or polyethylene terephthalate, for example.

The first adhesive layer AL1 may be disposed between the window protection layer WP and the window WIN. The window protection layer WP and the window WIN may be bonded to each other by the first adhesive layer AL1. The first adhesive layer AL1 may cover the printed layer PIT.

The second adhesive layer AL2 may be disposed between the window WIN and the impact absorbing layer ISL. The window WIN and the impact absorbing layer ISL may be bonded to each other by the second adhesive layer AL2.

The third adhesive layer AL3 may be disposed between the impact absorbing layer ISL and the electronic panel EP. The impact absorbing layer ISL and the electronic panel EP may be bonded to each other by the third adhesive layer AL3.

The fourth adhesive layer AL4 may be disposed between the electronic panel EP and the panel protection layer PPL. The electronic panel EP and the panel protection layer PPL may be bonded to each other by the fourth adhesive layer AL4.

The first to fourth adhesive layers AL1 to AL4 may include a pressure sensitive adhesive ("PSA") or an optically clear adhesive ("OCA"). However, the type of adhesive is not limited thereto.

Figure 6:
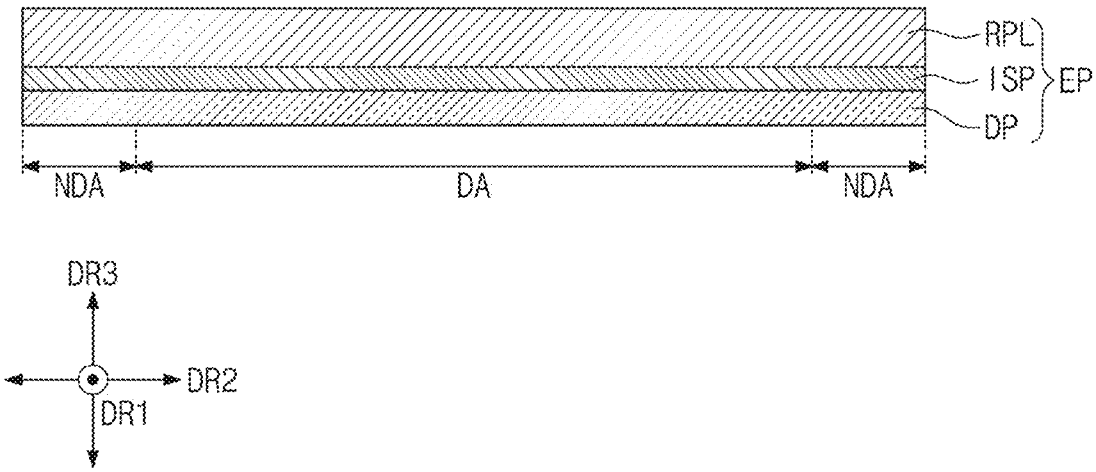
FIG. 6 is a cross-sectional view illustrating a configuration of an electronic panel illustrated in FIG. 5.

FIG. 6 is a cross-sectional view illustrating a configuration of the electronic panel illustrated in FIG. 5.

In FIG. 6, a section of the electronic panel EP viewed in the first direction DR1 is illustrated.

Referring to FIG. 6, the electronic panel EP may include the display panel DP, the input sensing part ISP disposed on the display panel DP, and the anti-reflection layer RPL disposed on the input sensing part ISP. The display panel DP may be a flexible display panel. In an embodiment, the display panel DP may include a flexible substrate and a plurality of elements disposed on the flexible substrate, for example.

The display panel DP in an embodiment of the disclosure may be an emissive display panel, but is not particularly limited. In an embodiment, the display panel DP may be an organic light-emitting display panel or an inorganic light-emitting display panel, for example. An emissive layer of the organic light-emitting display panel may include an organic light-emitting material. An emissive layer of the inorganic light-emitting display panel may include quantum dots, quantum rods, or the like. Hereinafter, it will be exemplified that the display panel DP is an organic light-emitting display panel.

The input sensing part ISP may include a plurality of sensors (not illustrated) for sensing an external input. In an embodiment, the input sensing part ISP may sense an external input in a capacitive manner, for example. However, a sensing method of the input sensing part ISP is not limited thereto. The input sensing part ISP may be directly formed on the display panel DP when the electronic panel EP is manufactured.

The anti-reflection layer RPL may be disposed on the input sensing part ISP. The anti-reflection layer RPL may be directly formed on the input sensing part ISP when the electronic panel EP is manufactured. The anti-reflection layer RPL may be defined as a film for preventing reflection of external light. The anti-reflection layer RPL may decrease the reflectance of external light incident toward the display panel DP from above the display device DD.

When external light travelling toward the display panel DP is reflected from the display panel DP and provided back to the user, the user may visually recognize the external light as in a mirror. To prevent such a phenomenon, the anti-reflection layer RPL may include a plurality of color filters that display the same colors as those of pixels of the display panel DP.

The color filters may filter the external light into the same colors as those of the pixels. In this case, the external light may not be visible to the user. However, without being limited thereto, the anti-reflection layer RPL may include a phase retarder and/or a polarizer to decrease the reflectance of the external light.

In an embodiment, the input sensing part ISP may be directly formed on the display panel DP, and the anti-reflection layer RPL may be directly formed on the input sensing part ISP, for example. However, the disclosure is not limited thereto. In an embodiment, the input sensing part ISP may be separately manufactured and may be attached to the display panel DP by an adhesive layer, and the anti-reflection layer RPL may be separately manufactured and may be attached to the input sensing part ISP by an adhesive layer, for example.

Figure 7:
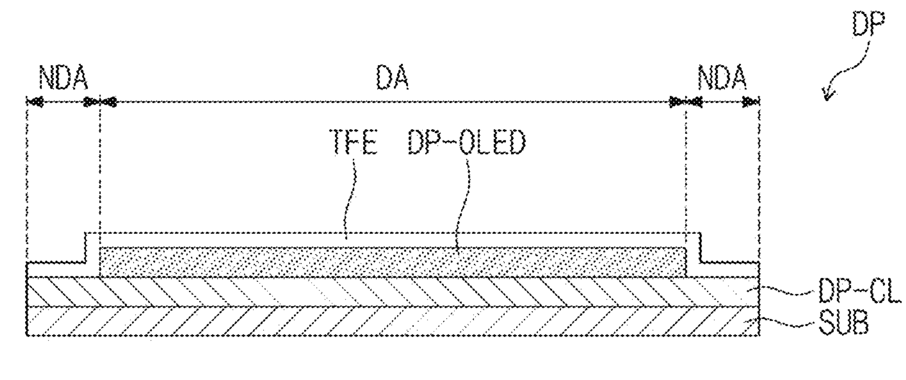
FIG. 7 is a cross-sectional view illustrating a configuration of a display panel illustrated in FIG. 6.
Figure 7:
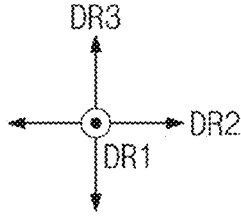

FIG. 7 is a cross-sectional view illustrating a configuration of the display panel illustrated in FIG. 6.

In FIG. 7, a section of the display panel DP viewed in the first direction DR1 is illustrated.

Referring to FIG. 7, the display panel DP may include a substrate SUB, a circuit element layer DP-CL disposed on the substrate SUB, a display element layer DP-OLED disposed on the circuit element layer DP-CL, and a thin film encapsulation layer TFE disposed on the display element layer DP-OLED.

The substrate SUB may include a display region DA and a non-display region NDA around the display region DA. The substrate SUB may include a flexible plastic material such as polyimide. The display element layer DP-OLED may be disposed on the display region DA.

A plurality of pixels may be disposed on the display region DA. Each of the pixels may include a light-emitting element that is connected to a transistor disposed in the circuit element layer DP-CL and is disposed in the display element layer DP-OLED.

The thin film encapsulation layer TFE may be disposed on the circuit element layer DP-CL to cover the display element layer DP-OLED. The thin film encapsulation layer TFE may include inorganic layers and an organic layer between the inorganic layers. The inorganic layers may protect the pixels from moisture/oxygen. The organic layer may protect the pixels from foreign matter such as dust particles.

Figure 8:
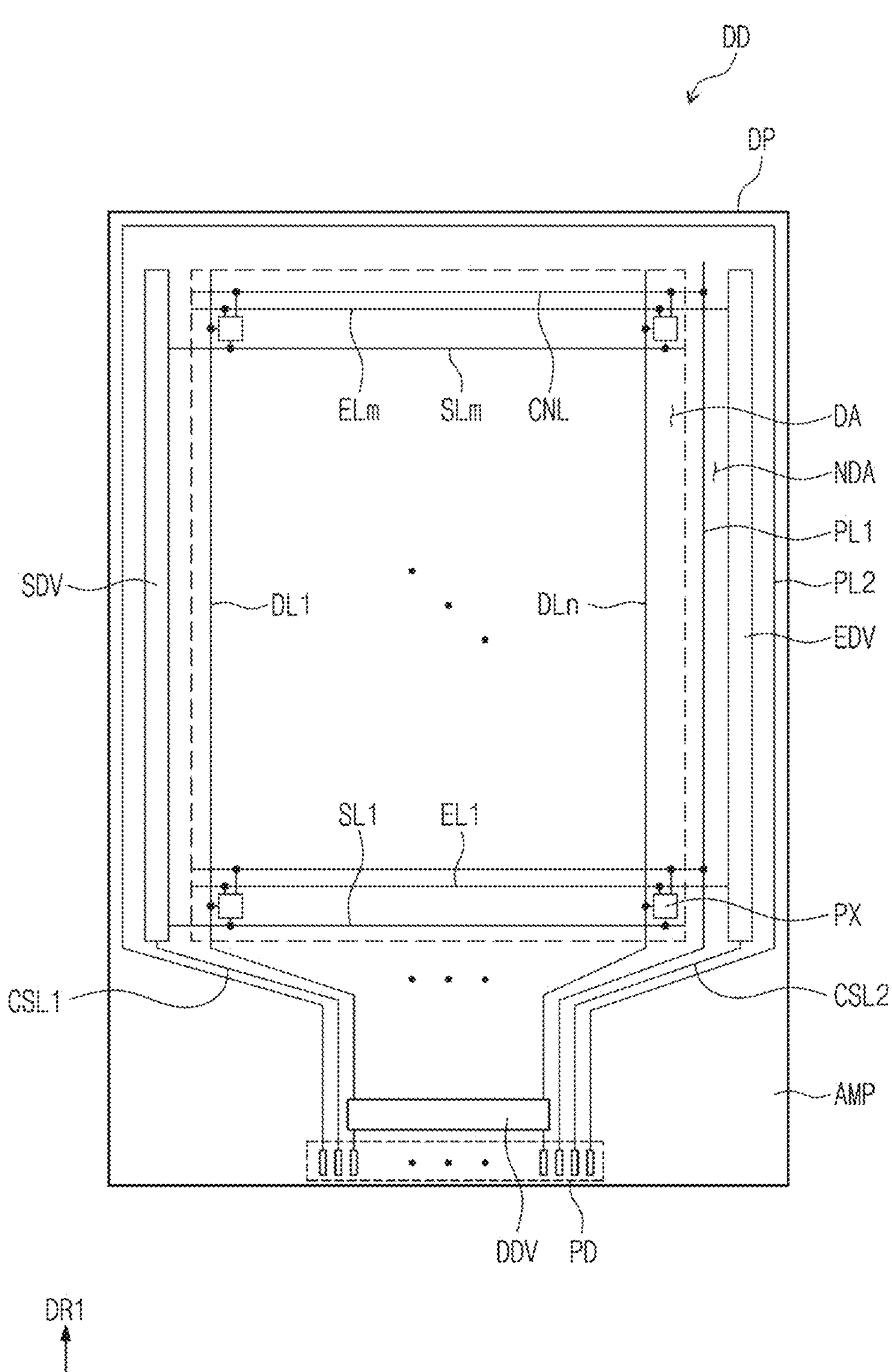
FIG. 8 is a plan view of the display panel illustrated in FIG. 7.

FIG. 8 is a plan view of the display panel illustrated in FIG. 7.

Referring to FIG. 8, the display device DD may include the display panel DP, a scan driver SDV, a data driver DDV, a light emission driver EDV, and a plurality of pads PD.

The display panel DP may have a quadrangular shape, e.g., rectangular shape with long sides extending in the first direction DR1 and short sides extending in the second direction DR2. However, the shape of the display panel DP is not limited thereto. The display panel DP may include a display region DA and a non-display region NDA surrounding the display region DA.

The display panel DP may include a plurality of pixels PX, a plurality of scan lines SL1 to SLm, a plurality of data lines DL1 to DLn, a plurality of light emission lines ELi to ELm, first and second control lines CSL1 and CSL2, first and second power lines PL1 and PL2, and a plurality of connecting lines CNL. Here, "m" and "n" are natural numbers.

The pixels PX may be disposed in the display region DA. The scan driver SDV and the light emission driver EDV may be disposed in the non-display regions NDA adjacent to the long sides of the display panel DP, respectively. The data driver DDV may be disposed in the non-display region NDA adjacent to one of the short sides of the display panel DP. In the plan view, the data driver DDV may be adjacent to a lower end of the display panel DP.

In FIG. 8, the accommodated portion AMP may be defined as the non-display region NDA adjacent to the lower end of the display panel DP. The data driver DDV may be disposed on the accommodated portion AMP.

The scan lines SL1 to SLm may extend in the second direction DR2 and may be connected to the pixels PX and the scan driver SDV. The data lines DL1 to DLn may extend in the first direction DR1 and may be connected to the pixels PX and the data driver DDV. The light emission lines ELi to ELm may extend in the second direction DR2 and may be connected to the pixels PX and the light emission driver EDV.

The first power line PL1 may extend in the first direction DR1 and may be disposed in the non-display region NDA. The first power line PL1 may be disposed between the display region DA and the light emission driver EDV.

The connecting lines CNL may extend in the second direction DR2 and may be arranged in the first direction DR1 and connected to the first power line PL1 and the pixels PX. A first voltage may be applied to the pixels PX through the first power line PL1 and the connecting lines CNL connected with each other.

The second power line PL2 may be disposed in the non-display region NDA and may extend along the long sides of the display panel DP and the other short side of the display panel DP where the data driver DDV is not disposed. The second power line PL2 may be disposed outward of the scan driver SDV and the light emission driver EDV.

Although not illustrated, the second power line PL2 may extend toward the display region DA and may be connected to the pixels PX. A second voltage having a lower level than that of the first voltage may be applied to the pixels PX through the second power line PL2.

The first control line CSL1 may be connected to the scan driver SDV and may extend toward the lower end of the display panel DP. The second control line CSL2 may be connected to the light emission driver EDV and may extend toward the lower end of the display panel DP. The data driver DDV may be disposed between the first control line CSL1 and the second control line CSL2.

The pads PD may be disposed in the non-display region NDA adjacent to the lower end of the display panel DP and may be closer to the lower end of the display panel DP than the data driver DDV is to the lower end of the display panel DP. The data driver DDV, the first power line PL1, the second power line PL2, the first control line CSL1, and the second control line CSL2 may be connected to the pads PD. The data lines DL1 to DLn may be connected to the data driver DDV, and the data driver DDV may be connected to the pads PD corresponding to the data lines DL1 to DLn.

Although not illustrated, the display device DD may further include a timing controller for controlling operations of the scan driver SDV, the data driver DDV, and the light emission driver EDV and a voltage generator for generating the first and second voltages. The timing controller and the voltage generator may be connected to the pads PD through a printed circuit board.

The scan driver SDV may generate a plurality of scan signals, and the scan signals may be applied to the pixels PX through the scan lines SL1 to SLm. The data driver DDV may generate a plurality of data voltages, and the data voltages may be applied to the pixels PX through the data lines DL1 to DLn. The light emission driver EDV may generate a plurality of light emission signals, and the light emission signals may be applied to the pixels PX through the light emission lines ELi to ELm.

The pixels PX may receive the data voltages in response to the scan signals. The pixels PX may display an image by emitting light having luminance corresponding to the data voltages in response to the light emission signals.

Figure 9:
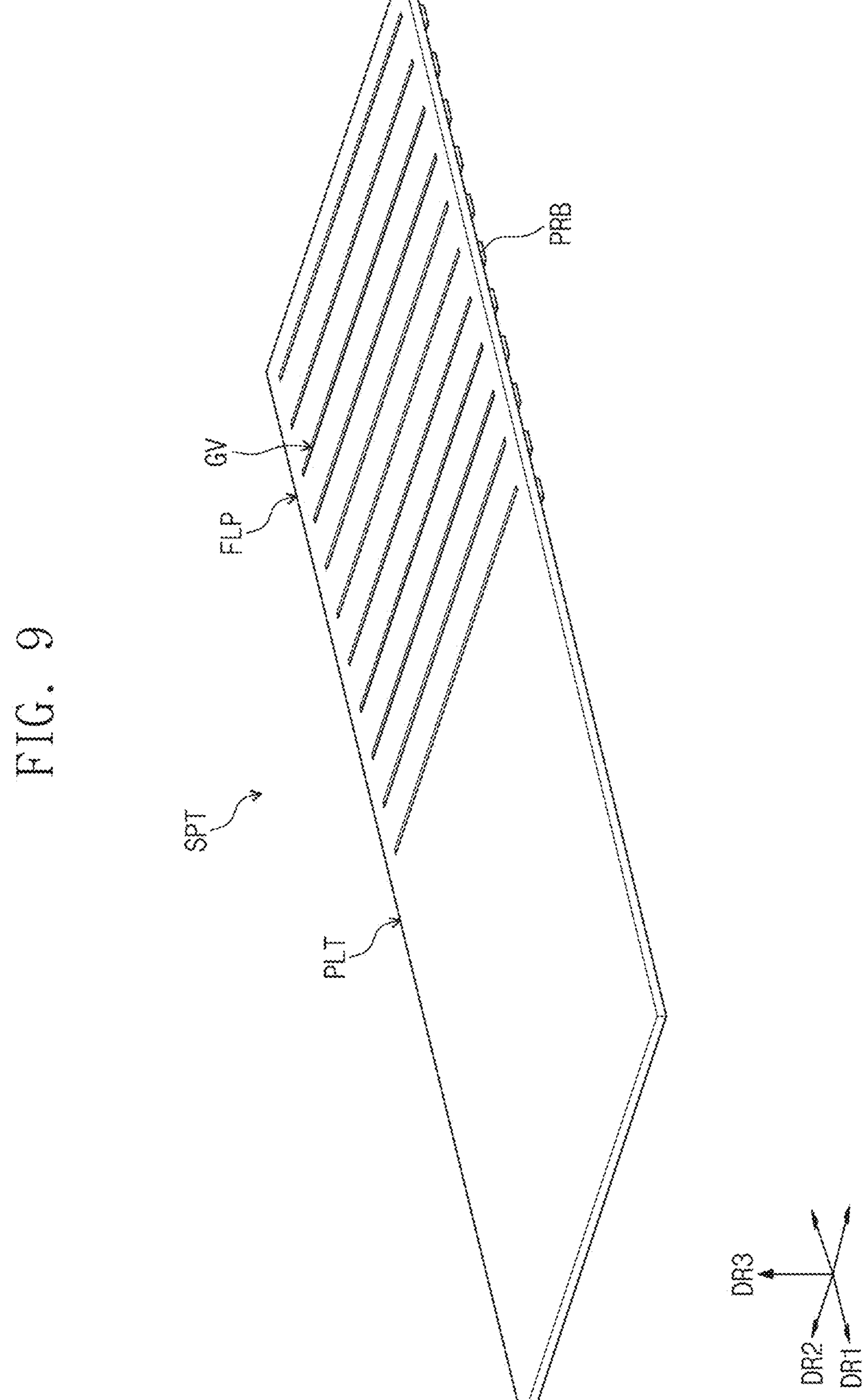
FIG. 9 is a perspective view of a support plate supporting the display module illustrated in FIG. 3.
Figure 10:
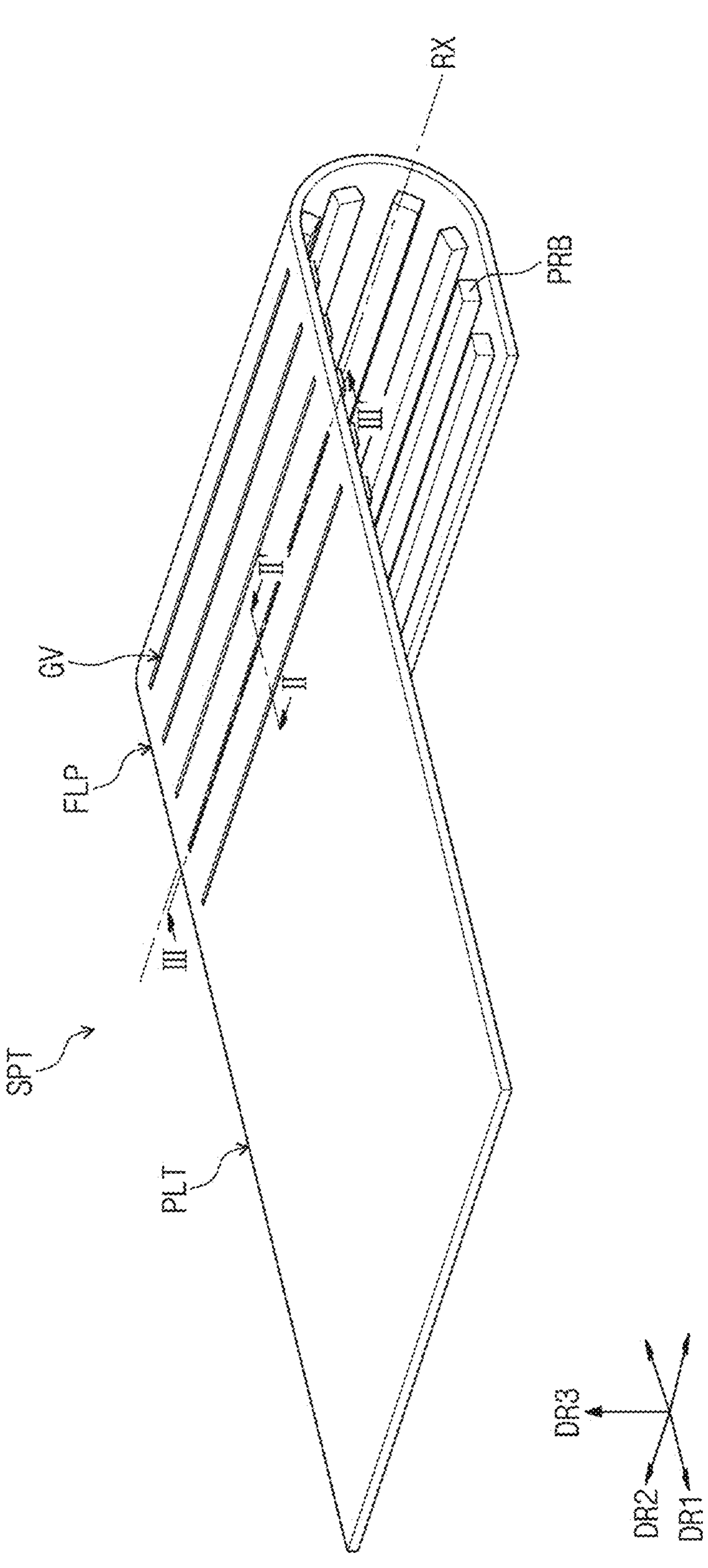
FIG. 10 is a view illustrating a bent state of the support plate illustrated in FIG. 9.
Figure 11:
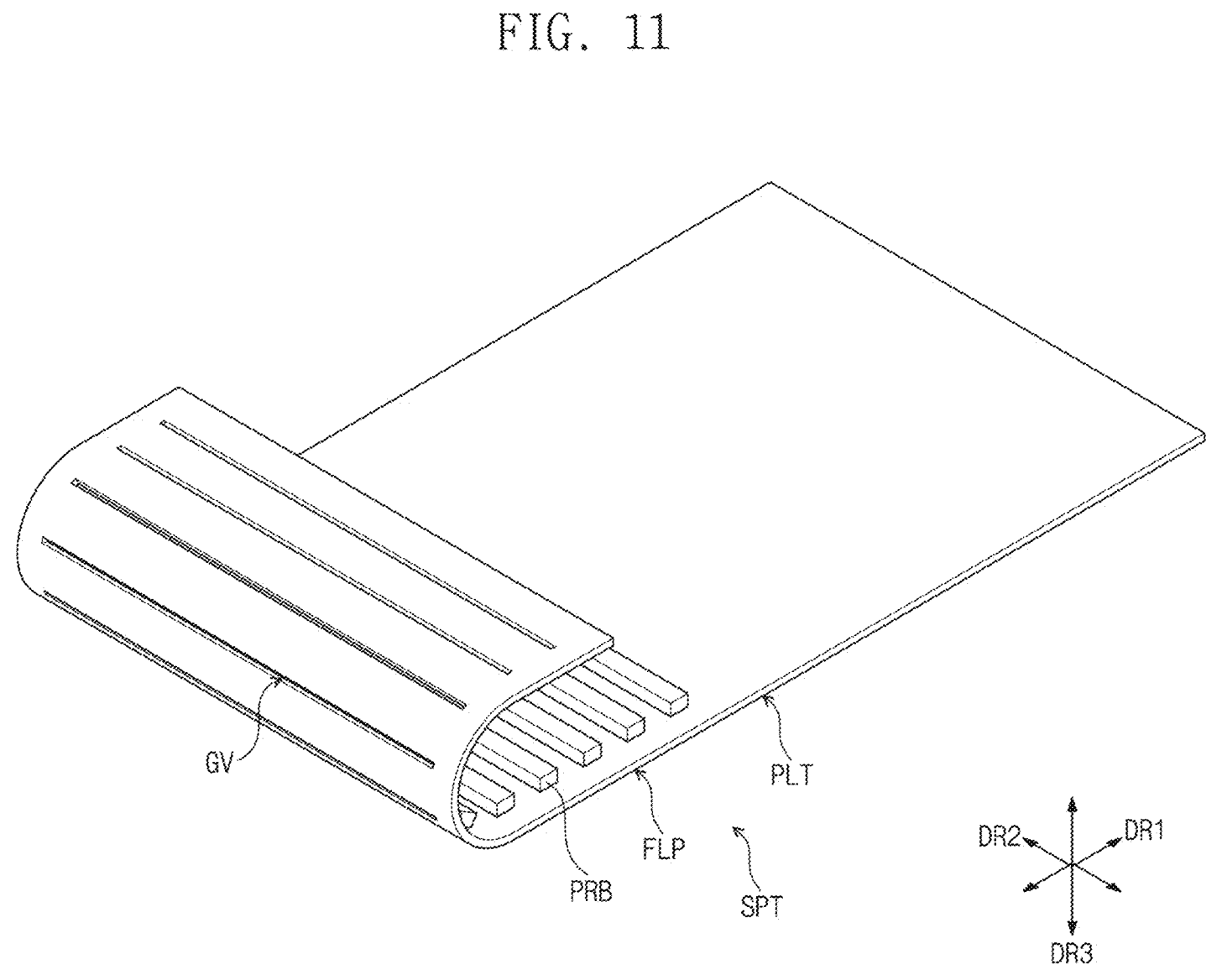

FIG. 9 is a perspective view of the support plate supporting the display module illustrated in FIG. 3. FIG. 10 is a view illustrating a bent state of the support plate illustrated in FIG. 9. FIG. 11 is a view illustrating a rear side of the bent support plate illustrated in FIG. 10.

Figure 14:
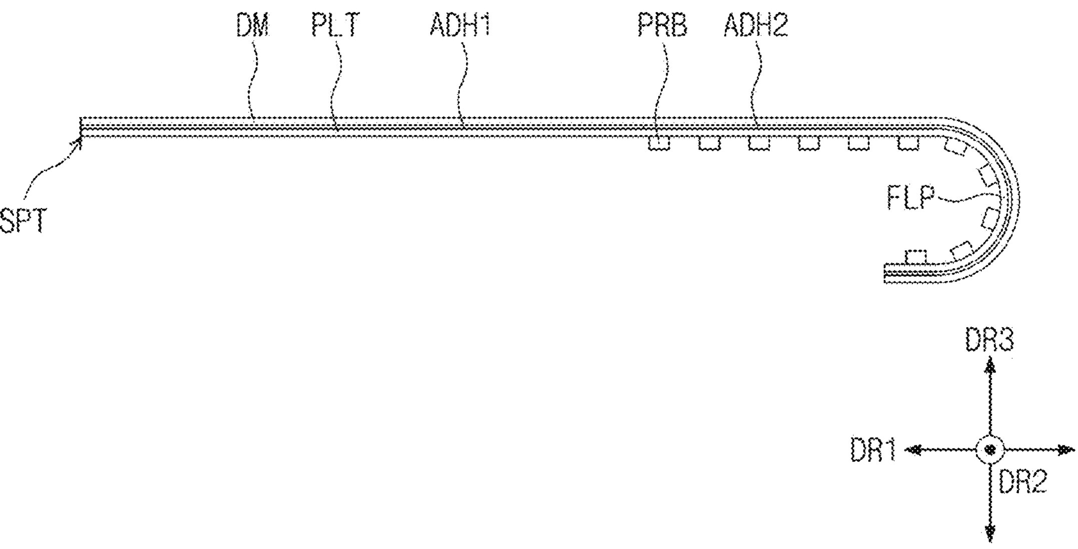
FIG. 14 is a view illustrating a configuration in which the display module illustrated in FIG. 4 and the support plate illustrated in FIG. 10 are bonded to each other.

Referring to FIGS. 9, 10, and 11, the support plate SPT may be disposed under the display module DM illustrated in FIG. 3 and may support the display module DM. This configuration is illustrated in FIG. 14. The support plate SPT may include metal. In an embodiment, the support plate SPT may include a metallic material such as stainless steel, for example.

A plurality of grooves GV may be defined in an upper surface of a portion of the support plate SPT, and a plurality of protruding bars PRB may protrude downward from portions of the support plate SPT that overlap the grooves GV. Specifically, the support plate SPT may include a flat portion PLT, a flexible portion FLP in which the grooves GV are defined, and the plurality of protruding bars PRB protruding downward from the flexible portion FLP.

The flat portion PLT may have a plane defined by the first direction DR1 and the second direction DR2. The flat portion PLT may remain flat. The flat portion PLT may have a higher elastic modulus than that of the flexible portion FLP.

The flexible portion FLP may extend from the flat portion PLT in the first direction DR1. The flexible portion FLP may be folded such that part of the flexible portion FLP is disposed under the flat portion PLT. The flexible portion FLP may be folded about a rotational axis RX extending in one direction. In an embodiment, the one direction may be defined as the second direction DR2, for example.

The rotational axis RX may be a rotational axis of a gear to be described below, and this configuration will be described below in detail. When the flexible portion FLP is folded, one part of the flexible portion FLP may be in a bent state, and another part of the flexible portion FLP may be disposed under the flat portion PLT.

The grooves GV may be defined in an upper surface of the flexible portion FLP. The upper surface of the flexible portion FLP may be defined as a surface that faces the display module DM. The grooves GV may extend in the second direction DR2 and may be arranged in the first direction DR1. The grooves GV may be spaced apart from opposite sides of the flexible portion FLP opposite to each other in the second direction DR2. That is, the grooves GV may not extend to the opposite sides of the flexible portion FLP.

As the grooves GV are defined in the flexible portion FLP, the flexible portion FLP may be more flexible than the flat portion PLT. That is, the flexible portion FLP may have a lower elastic modulus than that of the flat portion PLT. As the grooves GV are defined in the flexible portion FLP, the flexible portion FLP may be more easily bent.

The protruding bars PRB may protrude downward from the flexible portion FLP. The protruding bars PRB may have a bar shape. The protruding bars PRB may extend in the second direction DR2 and may be arranged in the first direction DR1. The protruding bars PRB may be spaced apart from the opposite sides of the flexible portion FLP opposite to each other in the second direction DR2. That is, the protruding bars PRB may not extend to the opposite sides of the flexible portion FLP. The protruding bars PRB may overlap the grooves GV.

Figure 12:
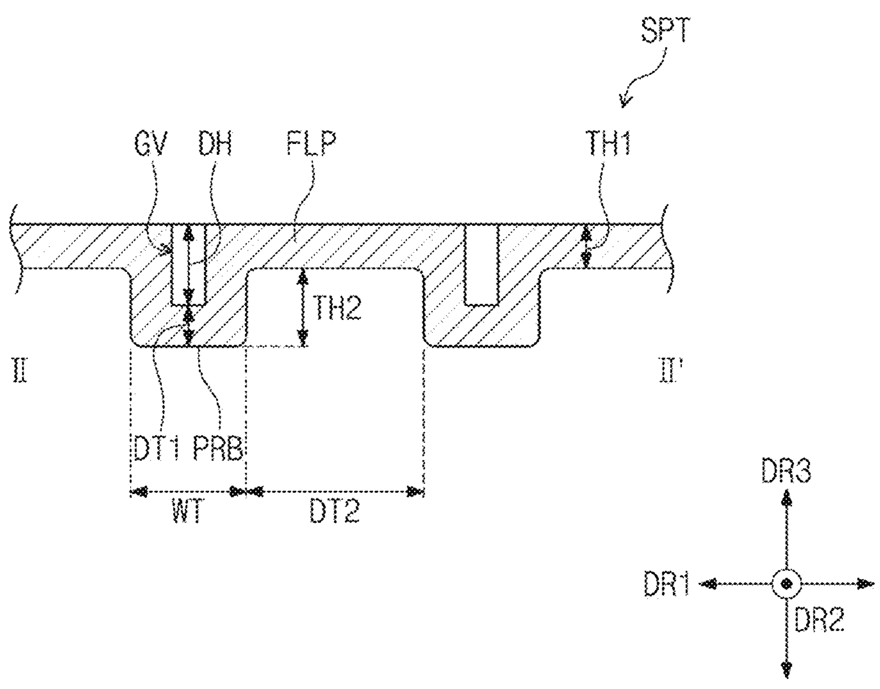
FIG. 12 is a cross-sectional view taken along line II-II' illustrated in FIG. 10.
Figure 13:
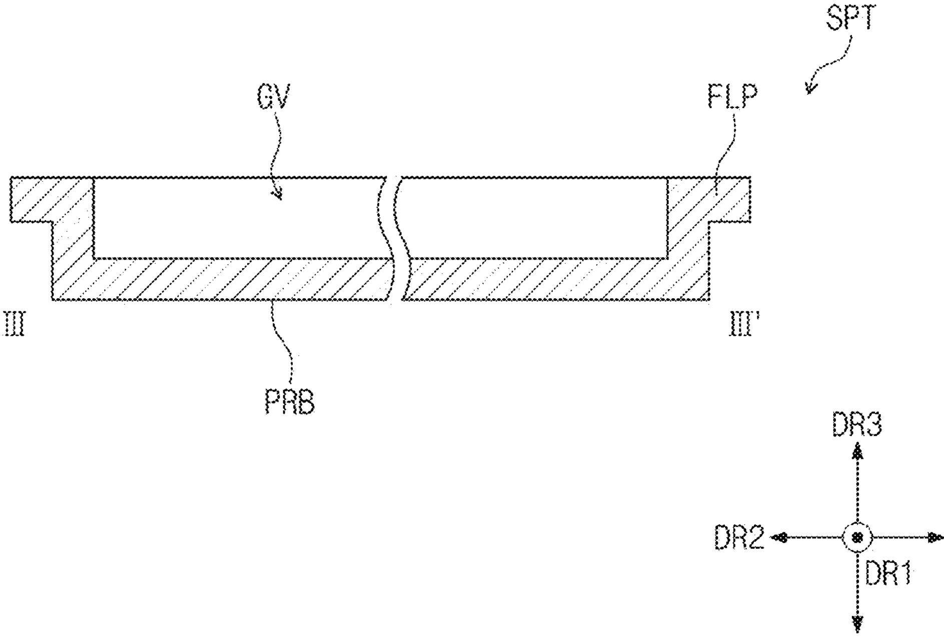
FIG. 13 is a cross-sectional view taken along line III-III' illustrated in FIG. 10.

FIG. 12 is a cross-sectional view taken along line II-II' illustrated in FIG. 10. FIG. 13 is a cross-sectional view taken along line III-III' illustrated in FIG. 10.

Referring to FIG. 12, the grooves GV may be defined by being recessed from the upper surface toward the lower surface of the flexible portion FLP. The grooves GV may be defined to overlap the protruding bars PRB. Substantially, the grooves GV and the protruding bars PRB may be respectively defined and formed by a compressive forming process using a mold, and this process will be described below in detail.

The grooves GV may extend toward the protruding bars PRB in the third direction DR3. The grooves GV may extend into the protruding bars PRB to overlap the protruding bars PRB. The grooves GV may overlap central portions of the protruding bars PRB, respectively.

In the third direction DR3, the flexible portion FLP may have a first thickness TH1, and each of the protruding bars PRB may have a second thickness TH2. The flat portion PLT may have the first thickness TH1 in the third direction DR3.

The second thickness TH2 may be defined as the distance between the lower surface of the flexible portion FLP and the lower surface of the protruding bar PRB in the third direction DR3. The second thickness TH2 may be greater than the first thickness TH1. In an embodiment, the first thickness TH1 may be about 80 micrometers (μm), and the second thickness TH2 may be about 100 micrometers (μm), for example.

The depth DH of each of the grooves GV in the third direction DR3 may be equal to the second thickness TH2. A first distance DTT between the bottom of the groove GV and the lower surface of the protruding bar PRB in the third direction DR3 may be equal to the first thickness TH1.

The width WT of the protruding bar PRB in the first direction DR1 may be smaller than a second distance DT2 between the protruding bars PRB adjacent to each other. In an embodiment, the width WT of each of the protruding bars PRB may be about 1.2 millimeters, and the second distance DT2 between the protruding bars PRB adjacent to each other may be about 2.3 millimeters (mm), for example.

Referring to FIG. 13, the groove GV may be defined in the protruding bar PRB by being recessed downward from the upper surface of the flexible portion FLP. The groove GV and the protruding bar PRB may extend in the second direction DR2, but may be spaced apart from the opposite sides of the flexible portion FLP without extending to the opposite sides of the flexible portion FLP.

FIG. 14 is a view illustrating a configuration in which the display module illustrated in FIG. 4 and the support plate illustrated in FIG. 10 are bonded to each other.

In FIG. 14, side surfaces of the display module DM and the support plate SPT viewed in the second direction DR2 are illustrated.

Referring to FIG. 14, the support plate SPT may be disposed under the display module DM and may be attached to the display module DM. The support plate SPT may be attached to the rear surface of the display module DM that faces away from the front surface (e.g., the display surface) of the display module DM.

Adhesive layers ADH1 and ADH2 may be disposed between the support plate SPT and the display module DM. The support plate SPT and the display module DM may be bonded to each other by the adhesive layers ADH1 and ADH2. In an embodiment, the adhesive layers ADH1 and ADH2 may be pressure sensitive adhesive layers, for example.

The adhesive layers ADH1 and ADH2 may include the first adhesive layer ADH1 disposed between the display module DM and the flat portion PLT and the second adhesive layer ADH2 disposed between the display module DM and the flexible portion FLP. The first adhesive layer ADH1 may be disposed under a portion of the display module DM that overlaps the flat portion PLT, and the second adhesive layer ADH2 may be disposed under a portion of the display module DM that overlaps the flexible portion FLP.

The flat portion PLT may be attached to the display module DM by the first adhesive layer ADH1, and the flexible portion FLP may be attached to the display module DM by the second adhesive layer ADH2. The flexible portion FLP and the portion of the display module DM that overlaps the flexible portion FLP may be folded such that the support plate SPT and the display module DM are accommodated in the above-described case CS.

The second adhesive layer ADH2 may have a modulus different from that of the first adhesive layer ADH1. In an embodiment, the second adhesive layer ADH2 may have a lower storage modulus than that of the first adhesive layer ADH1, for example. That is, the second adhesive layer ADH2 may be more flexible than the first adhesive layer ADH1.

The flexible portion FLP, which is more flexible than the flat portion PLT, may be folded together with the display module DM. The second adhesive layer ADH2 attached to the flexible portion FLP may have a lower storage modulus than that of the flexible portion FLP such that the flexible portion FLP is easily folded together with the display module DM. Since the flat portion PLT remains flat, the first adhesive layer ADH1 having a higher storage modulus than that of the flat portion PLT may be attached to the flat portion PLT such that the flat portion PLT is not easily bent.

Figure 15:
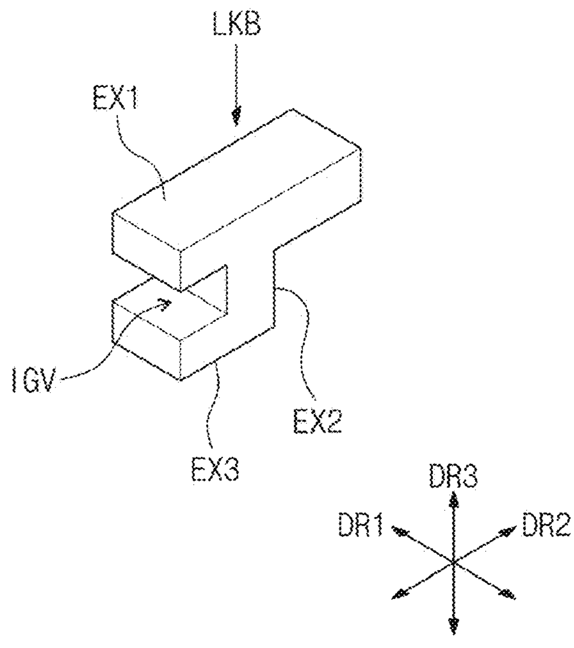
FIG. 15 is a perspective view of a link bar coupled to the support plate illustrated in FIG. 9.
Figure 16:
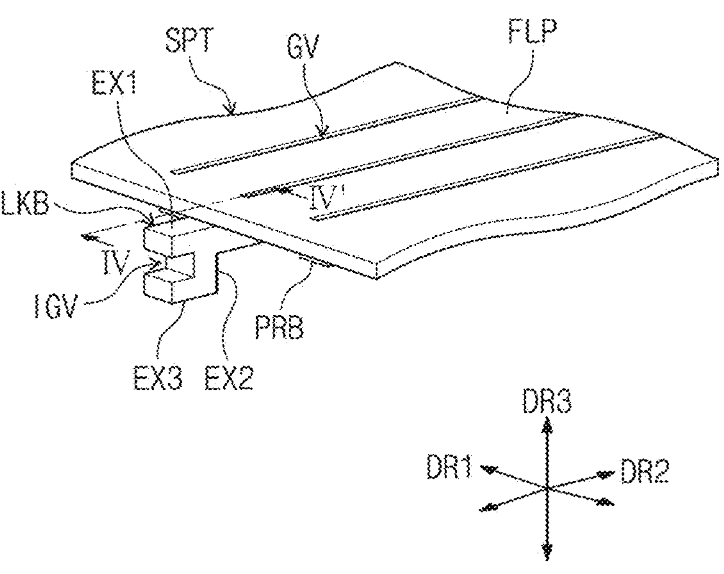
FIG. 16 is a view illustrating a state in which the link bar illustrated in FIG. 15 is coupled to the support plate.
Figure 17:
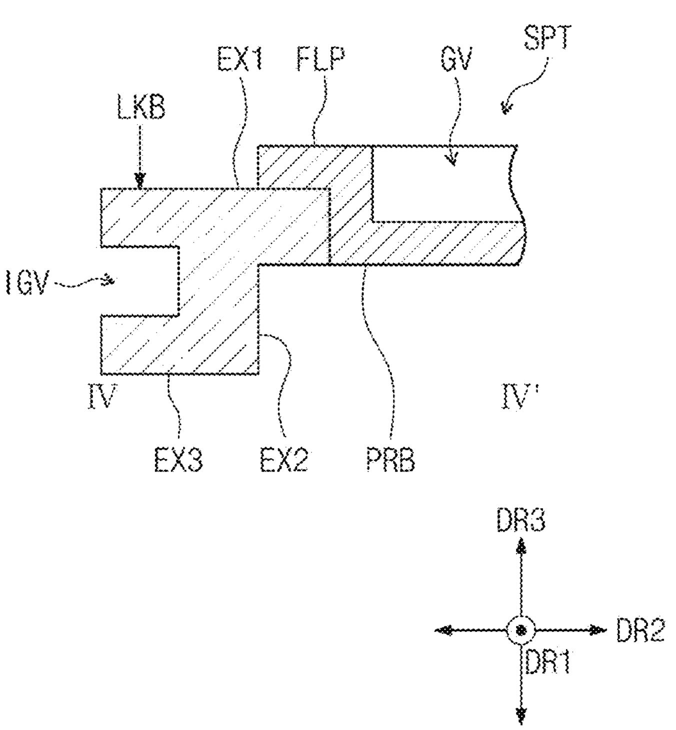
FIG. 17 is a cross-sectional view taken along line IV-IV' illustrated in FIG. 16.

FIG. 15 is a perspective view of a link bar coupled to the support plate illustrated in FIG. 9. FIG. 16 is a view illustrating a state in which the link bar illustrated in FIG. 15 is coupled to the support plate. FIG. 17 is a cross-sectional view taken along line IV-IV' illustrated in FIG. 16.

In FIG. 16, part of the flexible portion FLP is illustrated.

Referring to FIG. 15, the display device DD may include the link bar LKB. An insertion groove IGV may be defined in one side of the link bar LKB.

The link bar LKB may include a first extension EX1, a second extension EX2, and a third extension EX3. The first extension EXT may extend in the second direction DR2. The second extension EX2 may extend downward from a portion of the first extension EX1. The third extension EX3 may extend from a lower end of the second extension EX2 in the second direction DR2 and may face the first extension EXT in the third direction DR3.

A space between the first, second, and third extensions EX1, EX2, and EX3 may be defined as the insertion groove IGV. According to this structure, the insertion groove IGV may be defined in the one side of the link bar LKB. The link bar LKB may include a metallic material such as stainless steel.

Referring to FIGS. 16 and 17, the link bar LKB may be provided on the support plate SPT. The link bar LKB may protrude outward from the flexible portion FLP. The link bar LKB may be coupled to the support plate SPT. The link bar LKB may be coupled to a side surface of a corresponding one of the protruding bars PRB. The link bar LKB may be connected to the protruding bar PRB by a welding process.

Although one link bar LKB is illustrated in FIG. 16, a plurality of link bars LKB may be substantially coupled to the protruding bars PRB, respectively.

An end of the first extension EX1 that faces toward the support plate SPT and in which the insertion groove IGV is not defined may be connected to the protruding bar PRB. The first extension EX1 may be connected to the side surface of the protruding bar PRB and the lower surface of the flexible portion FLP. The insertion groove IGV may be defined in the one side of the link bar LKB that faces toward the outside.

Figure 18:
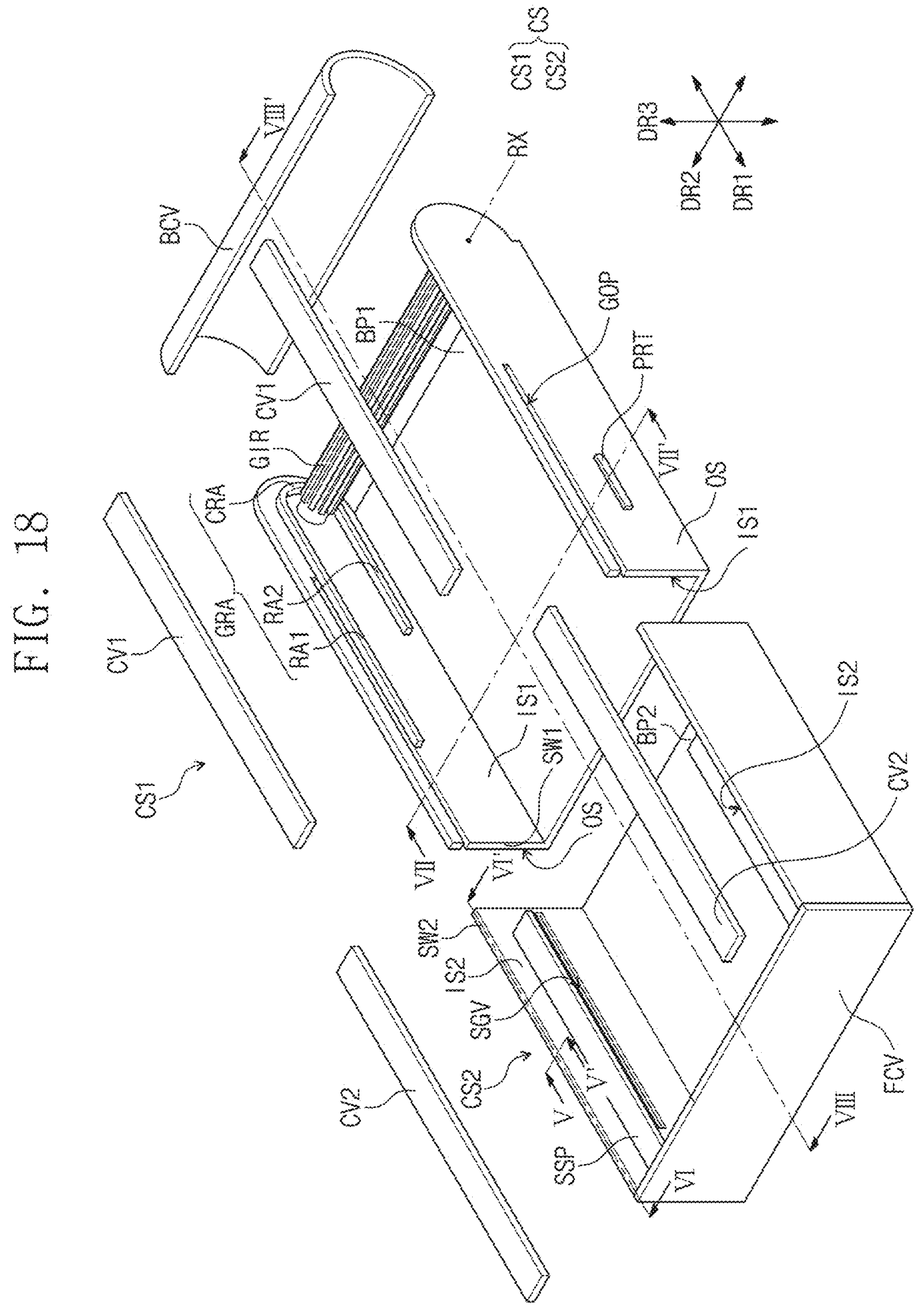
FIG. 18 is an exploded perspective view of the case illustrated in FIG. 1.

FIG. 18 is an exploded perspective view of the case illustrated in FIG. 1.

Referring to FIG. 18, the case CS may include the first case CS1 and the second case CS2 that are disposed in the first direction DR1. The first case CS1 and the second case CS2 may be coupled with each other in the first direction DR1.

The first case CS1 may include a first bottom part BP1, a plurality of first sidewalls SW1, a plurality of first covers CV1, a rear part BCV, a plurality of protrusions PRT, and a plurality of guide rails GRA. The display device DD may further include a gear GIR disposed in the first case CS1.

The first bottom part BP1 may have a plane defined by the first and second directions DR1 and DR2. The first sidewalls SW1 may extend upward (e.g., in an upper direction based on the third direction DR3) from opposite sides of the first bottom part BP1 opposite to each other in the second direction DR2. The first sidewalls SW1 may have a plane defined by the first and third directions DR1 and DR3. The first sidewalls SW1 may extend longer in the first direction DR1 than in the third direction DR3.

One side of each of the first sidewalls SW1 in the first direction DR1 may have a curved shape convex toward the outside. An opposite side of the first sidewall SW1 in the first direction DR1 may have a straight-line shape extending in the third direction DR3.

The first covers CV1 may be disposed on the first sidewalls SW1. The first covers CV1 may be connected to upper surfaces of the first sidewalls SW1. The first covers CV1 may have a plane defined by the first and second directions DR1 and DR2. The first covers CV1 may extend longer in the first direction DR1 than in the second direction DR2.

The rear part BCV may be disposed on one side of the first bottom part BP1 in the first direction DR1 and the one side of the first sidewall SW1 in the first direction DR1. The rear part BCV may be connected to the one side of the first bottom part BP1 and the one side of the first sidewall SW1. The one side of the first sidewall SW1 may be adjacent to the one side of the first bottom part BP1.

The rear part BCV may have a shape convex toward the outside to correspond to the curved shape on the one side of the first sidewall SW1. In an embodiment, when viewed in the second direction DR2, an outer surface of the rear part BCV that faces toward the outside may have a curved shape convex toward the outside, for example.

Surfaces of the first sidewalls SW1 that face each other in the second direction DR2 may be defined as first inner surfaces IS1. Surfaces of the first sidewalls SW1 opposite to the first inner surfaces IS1 may be defined as outer surfaces OS. The first inner surfaces IS1 may define inner surfaces of the case CS that face each other in the second direction DR2. Specifically, the first inner surfaces IS1 may define inner surfaces of the first case CS1 that face each other in the second direction DR2.

The protrusions PRT may be disposed on the outer surfaces OS, respectively. The protrusions PRT may extend in the first direction DR1. The protrusions PRT may protrude from the outer surfaces OS.

The guide rails GRA may be disposed on the first inner surfaces IS1. The guide rails GRA may be adjacent to the rear part BCV. The guide rails GRA may be connected to the first inner surfaces IS1.

Each of the guide rails GRA may include a first rail RA1, a second rail RA2, and a curved rail CRA. The first rail RA1 may extend in the first direction DR1. The second rail RA2 may be disposed under the first rail RA1 and may extend in the first direction DR1. The second rail RA2 may be longer than the first rail RA1.

The curved rail CRA may extend from one side of the first rail RA1 to one side of the second rail RA2. The one side of the first rail RA1 and the one side of the second rail RA2 may be adjacent to the rear part BCV. The curved rail CRA may have a curved shape adjacent to the rear part BCV and convexly extending toward the rear part BCV.

The second case CS2 may include a second bottom part BP2, a front part FCV, a plurality of second sidewalls SW2, a plurality of second covers CV2, and a plurality of sub-support parts SSP. The second bottom part BP2 may have a plane defined by the first and second directions DR1 and DR2.

The second sidewalls SW2 may extend upward from opposite sides of the second bottom part BP2 opposite to each other in the second direction DR2. The second sidewalls SW2 may have a plane defined by the first and third directions DR1 and DR3. The second sidewalls SW2 may extend longer in the first direction DR1 than in the third direction DR3.

The second bottom part BP2 may be disposed under the first bottom part BP1. The second sidewalls SW2 may be disposed outward of the first sidewalls SW1. That is, the second sidewalls SW2 may be disposed on the outer surfaces OS of the first sidewalls SW1.

The front part FCV may face the rear part BCV. The front part FCV may be disposed on one side of the second bottom part BP2 in the first direction DR1. The one side of the second bottom part BP2 may be defined as a portion of the second bottom part BP2 that is farthest from the rear part BCV. The front part FCV may be connected to the one side of the second bottom part BP2 and may extend upward.

The front part FCV may have a plane defined by the second and third directions DR2 and DR3. The front part FCV may extend longer in the second direction DR2 than in the third direction DR3.

Surfaces of the second sidewalls SW2 that face each other in the second direction DR2 may be defined as second inner surfaces IS2. Sliding grooves SGV may be defined in the second inner surfaces IS2. The sliding grooves SGV may extend in the first direction DR1. When the second case CS2 is coupled to the first case CS1 and the second sidewalls SW2 are disposed on the outer surfaces OS of the first sidewalls SW1, the protrusions PRT may be inserted into the sliding grooves SGV. This configuration will be described below in detail.

The gear GIR may have a cylindrical shape extending in the second direction DR2. A plurality of protrusions that extend in the second direction DR2 and that are arranged in a circular shape on an outer circumferential surface of the gear GIR may be disposed on the outer circumferential surface of the gear GIR. The protrusions of the gear GIR may be spaced apart from the first sidewalls SW1.

The gear GIR may be connected to the first sidewalls SW1. Opposite sides of the gear GIR opposite to each other in the second direction DR2 may be connected to the first sidewalls SW1. The gear GIR may rotate about the rotational axis RX extending in the second direction DR2. The gear GIR may be disposed between the first rail RA1 and the second rail RA2. The gear GIR may be adjacent to the curved rail CRA.

The second covers CV2 may be disposed on the second sidewalls SW2. The second covers CV2 may be connected to upper surfaces of the second sidewalls SW2. The second covers CV2 may have a plane defined by the first and second directions DR1 and DR2. The second covers CV2 may extend longer in the first direction DR1 than in the second direction DR2. When the first case CS1 and the second case CS2 are coupled with each other, the second covers CV2 may be disposed on the first covers CV1, respectively.

The sub-support parts SSP may be disposed on the second inner surfaces IS2. The sub-support parts SSP may have a plane defined by the first and second directions DR1 and DR2. The sub-support parts SSP may extend longer in the first direction DR1 than in the second direction DR2. The sub-support parts SSP may be adjacent to the front part FCV. The sub-support parts SSP may be connected to the second inner surfaces IS2. The sub-support parts SSP may be disposed over the sliding grooves SGV.

Guide openings GOP may be defined in the first sidewalls SW1. Each of the guide openings GOP may be defined in the first sidewall SW1 by extending in the first direction DR1 from the opposite side of the first sidewall SW1. The guide openings GOP may be defined above the guide rails GRA. In an embodiment, the guide openings GOP may be defined above the first rails RA1, for example.

The guide openings GOP may overlap the first rails RA1. The guide openings GOP may extend so as to be adjacent to the curved rails CRA. The first rail RA1 may extend so as to be closer to the opposite side of the first sidewall SW1 than the second rail RA2 is to the opposite side of the first sidewall SW1.

The first rails RA1 may extend below portions of the guide openings GOP. When the first case CS1 and the second case CS2 are coupled with each other, the sub-support parts SSP may be disposed in the guide openings GOP.

Figure 19:
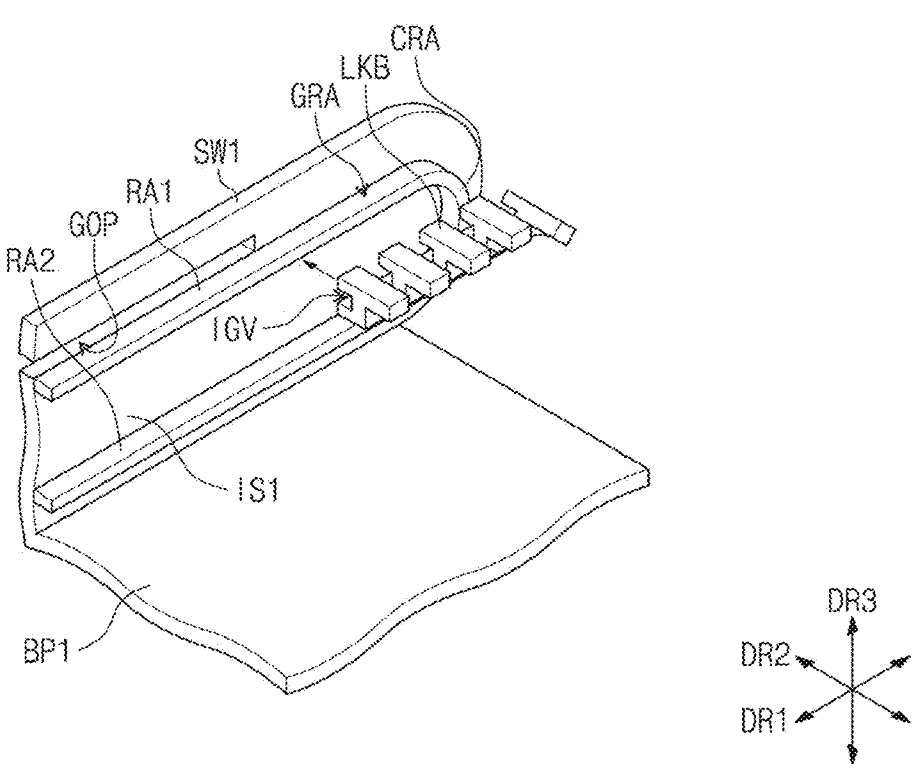
FIG. 19 is a view for describing a configuration in which link bars illustrated in FIGS. 15 to 17 are coupled to a guide rail.
Figure 20:
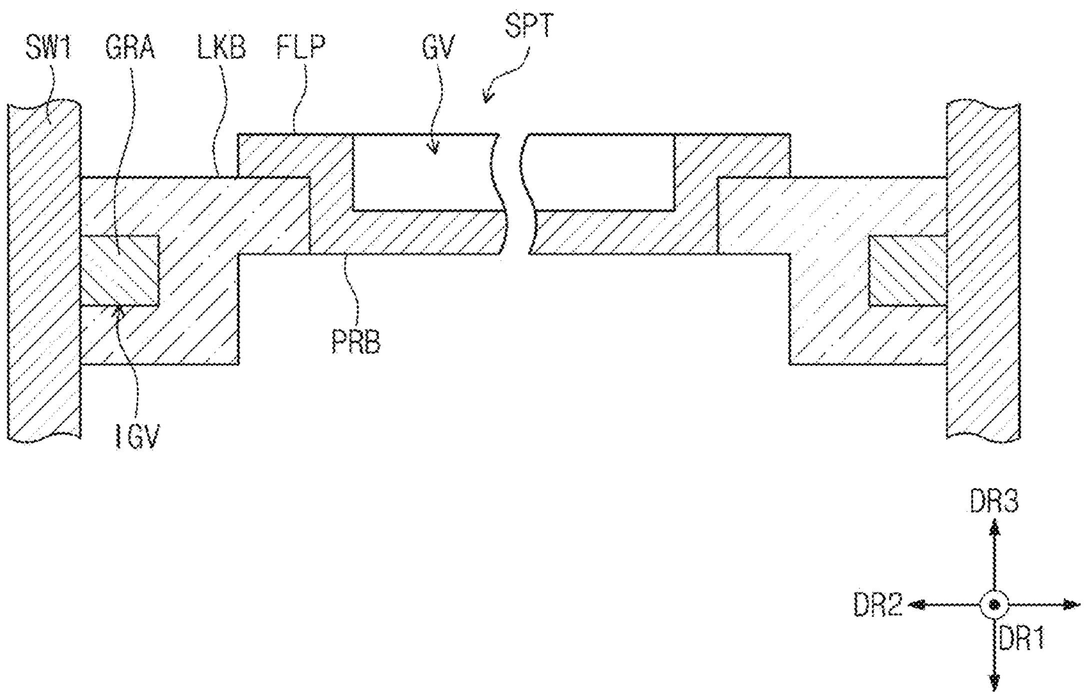
FIG. 20 is a cross-sectional view illustrating a state in which the link bars illustrated in FIG. 19 are coupled to the support plate and the guide rail.

FIG. 19 is a view for describing a configuration in which the link bars illustrated in FIGS. 15 to 17 are coupled to the guide rail. FIG. 20 is a cross-sectional view illustrating a state in which the link bars illustrated in FIG. 19 are coupled to the support plate and the guide rail.

In FIG. 19, some link bars LKB coupled to the left guide rail GRA are illustrated. FIG. 20 illustrates a section corresponding to the link bar LKB and the flexible portion FLP illustrated in FIG. 17. Furthermore, in FIG. 20, sections of the link bars LKB coupled to the guide rails GRA disposed on the left and right sides are illustrated to clearly describe connection of the link bars LKB.

Referring to FIGS. 19 and 20, the guide rails GRA may be connected to the first sidewalls SW1. The link bars LKB may be coupled to the guide rails GRA. In an embodiment, the guide rails GRA may be disposed in the insertion grooves IGV defined in sides of the link bars LKB, for example. The guide rails GRA may be inserted into the insertion grooves IGV and may be disposed in the insertion grooves IGV.

The link bars LKB may move along the guide rails GRA. The link bars LKB may move in the extension direction of the guide rails GRA through the insertion grooves IGV. The flexible portion FLP of the support plate SPT may be coupled to the guide rails GRA through the link bars LKB. The flexible portion FLP may move in the extension direction of the guide rails as the link bars LKB move.

Figure 21:
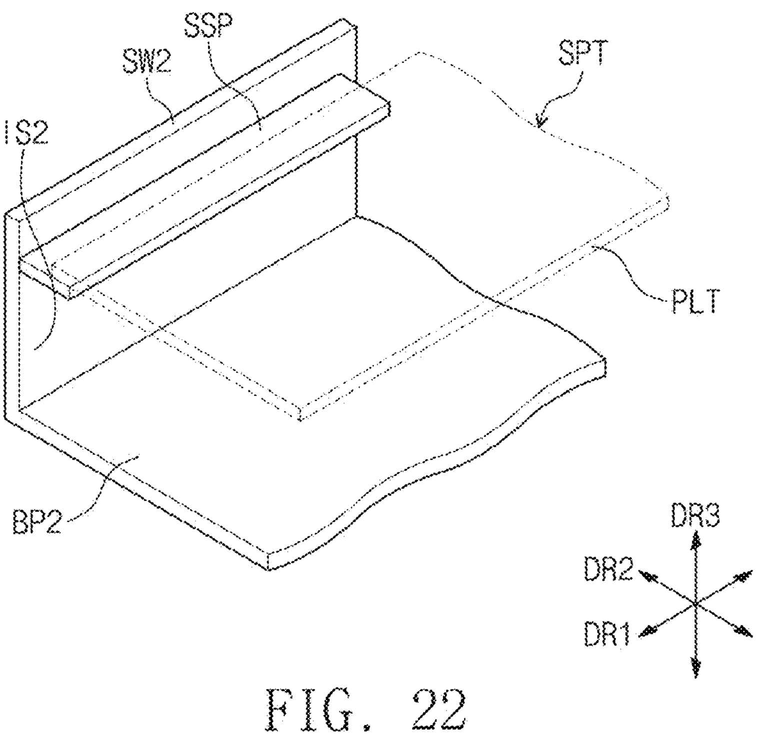
FIG. 21 is a view illustrating a state in which a flat portion illustrated in FIG. 10 is disposed on a sub-support part illustrated in FIG. 18.

FIG. 21 is a view illustrating a state in which the flat portion illustrated in FIG. 10 is disposed on the sub-support part illustrated in FIG. 18.

In FIG. 21, a portion of the second sidewall SW2, a portion of the second bottom part BP2, a portion of the flat portion PLT, and the sub-support part SSP are illustrated, and the support plate SPT is illustrated by dotted lines.

Referring to FIG. 21, the flexible portion FLP of the support plate SPT may be coupled to the guide rails GRA (refer to FIGS. 19 and 20) through the link bars LKB (refer to FIGS. 19 and 20). However, the flat portion PLT may not be coupled to the guide rails GRA. Accordingly, a structure for supporting the flat portion PLT is desired. In an embodiment of the disclosure, the sub-support part SSP may be disposed under the flat portion PLT and may support the flat portion PLT.

Figure 22:
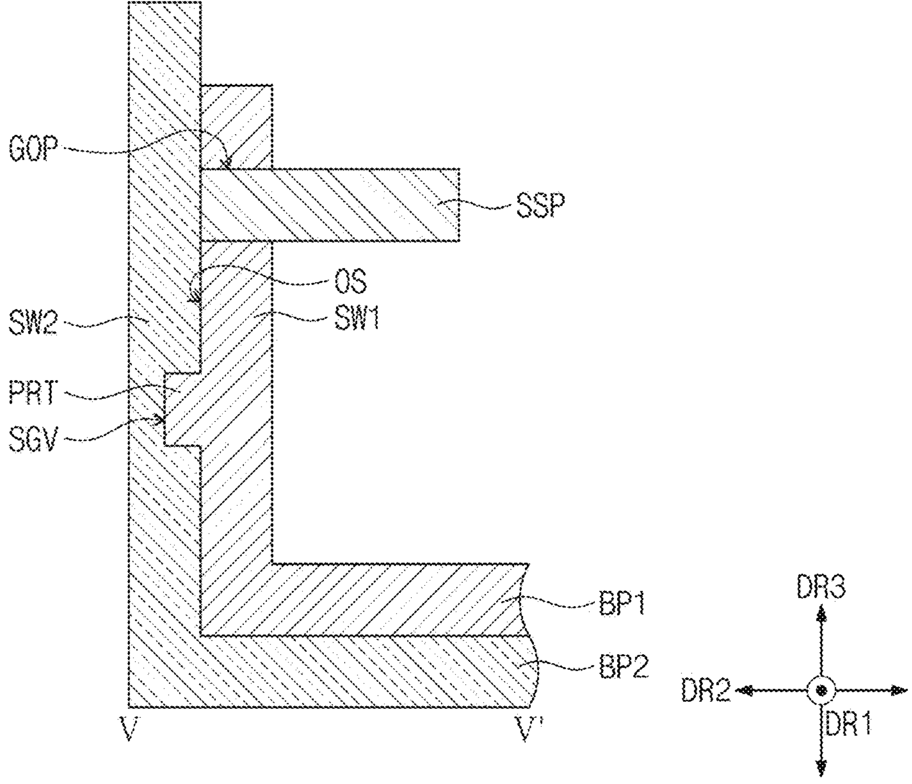
FIG. 22 is a cross-sectional view taken along line V-V' illustrated in FIG. 18.
Figure 23A:
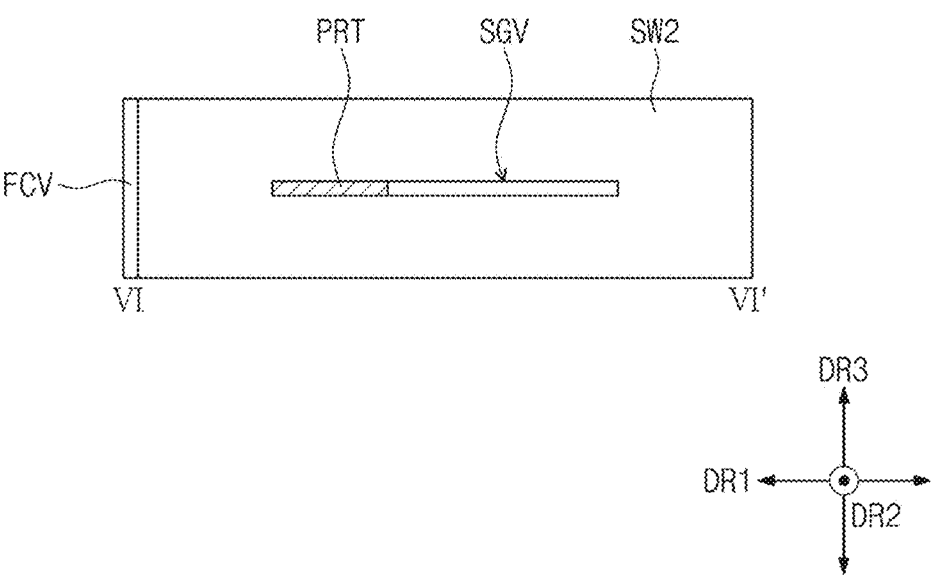
FIGS. 23A and 23B are cross-sectional views taken along line VI-VI' illustrated in FIG. 18.
Figure 23B:
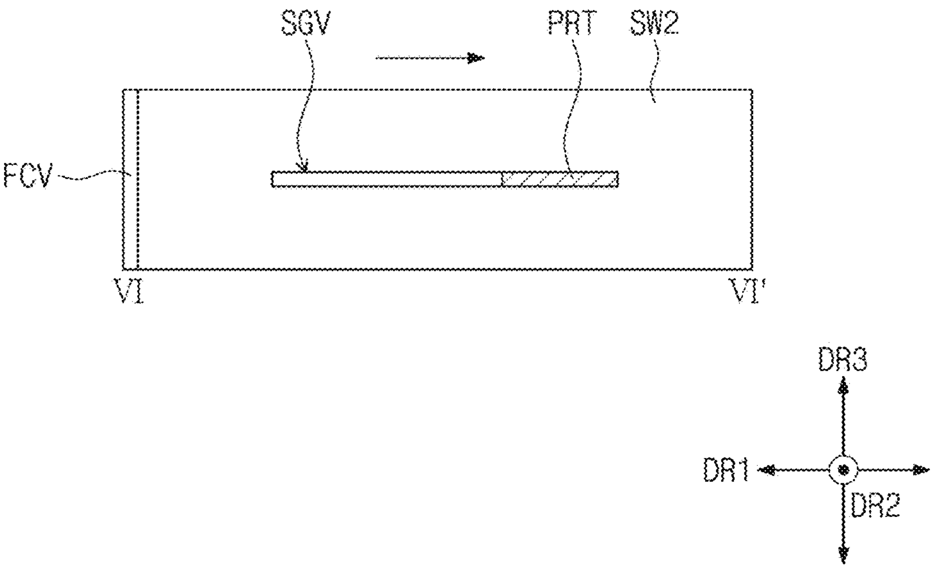

FIG. 22 is a cross-sectional view taken along line V-V' illustrated in FIG. 18. FIGS. 23A and 23B are cross-sectional views taken along line VI-VI' illustrated in FIG. 18.

In FIG. 22, assuming that the first and second cases CS1 and CS2 are coupled with each other, the first sidewall SW1 and the second sidewall SW2 are illustrated together. FIGS. 23A and 23B illustrate a state in which the protrusion PRT is disposed in the sliding groove SGV.

Referring to FIGS. 18 and 22, the second bottom part BP2 may be disposed under the first bottom part BP1 when the first and second cases CS1 and CS2 are coupled with each other. The second bottom part BP2 may contact the lower surface of the first bottom part BP1. The second sidewall SW2 may be disposed outward of the first sidewall SW1. The second sidewall SW2 may contact the outer surface OS of the first sidewall SW1.

The protrusion PRT may protrude from the first sidewall SW1. When the first and second cases CS1 and CS2 are coupled with each other, the protrusion PRT may be disposed in the sliding groove SGV defined in the second sidewall SW2.

The sub-support part SSP may be connected to the second sidewall SW2. The sub-support part SSP may be disposed in the guide opening GOP defined in the first sidewall SW1. When the first and second cases CS1 and CS2 move relative to each other in the first direction DR1, the sub-support part SSP may move along the guide opening GOP in the first direction DR1.

Referring to FIGS. 1, 18, 22, and 23A, in the default mode, the protrusion PRT may be disposed on one side of the sliding groove SGV. The one side of the sliding groove SGV may be adjacent to the front part FCV in the first direction DR1. When the second case CS2 moves toward the first case CS1 to the maximum, the protrusion PRT may be disposed on the one side of the sliding groove SGV.

Referring to FIGS. 2, 18, 22, and 23B, in the extended mode, the first case CS1 may move away from the second case CS2 in the first direction DR1. In an embodiment, when the first case CS1 moves in the first direction DR1, the protrusion PRT may move along the sliding groove SGV in the first direction DR1, for example. When the protrusion PRT moves along the sliding groove SGV and is disposed on an opposite side of the sliding groove SGV, the protrusion PRT may stop.

The opposite side of the sliding groove SGV may be a portion of the sliding groove SGV that is farthest from the front part FCV. The one side and the opposite side of the sliding groove SGV may be disposed opposite to each other in the first direction DR1.

When the first case CS1 continually moves away from the second case CS2, the first case CS1 may be separated from the second case CS2. However, in an embodiment of the disclosure, the first case CS1 may stop as the protrusion PRT moving in the first direction DR1 is disposed on the opposite side of the sliding groove SGV. The amount of movement of the first case CS1 may be controlled depending on the lengths of the protrusion PRT and the sliding groove SGV in the first direction DR1.

In the default mode illustrated in FIG. 1 and the extended mode illustrated in FIG. 2, the amount of movement of the first case CS1 relative to the second case CS2 may be determined by the protrusion PRT moving along the sliding groove SGV in the first direction DR1.

Figure 24:
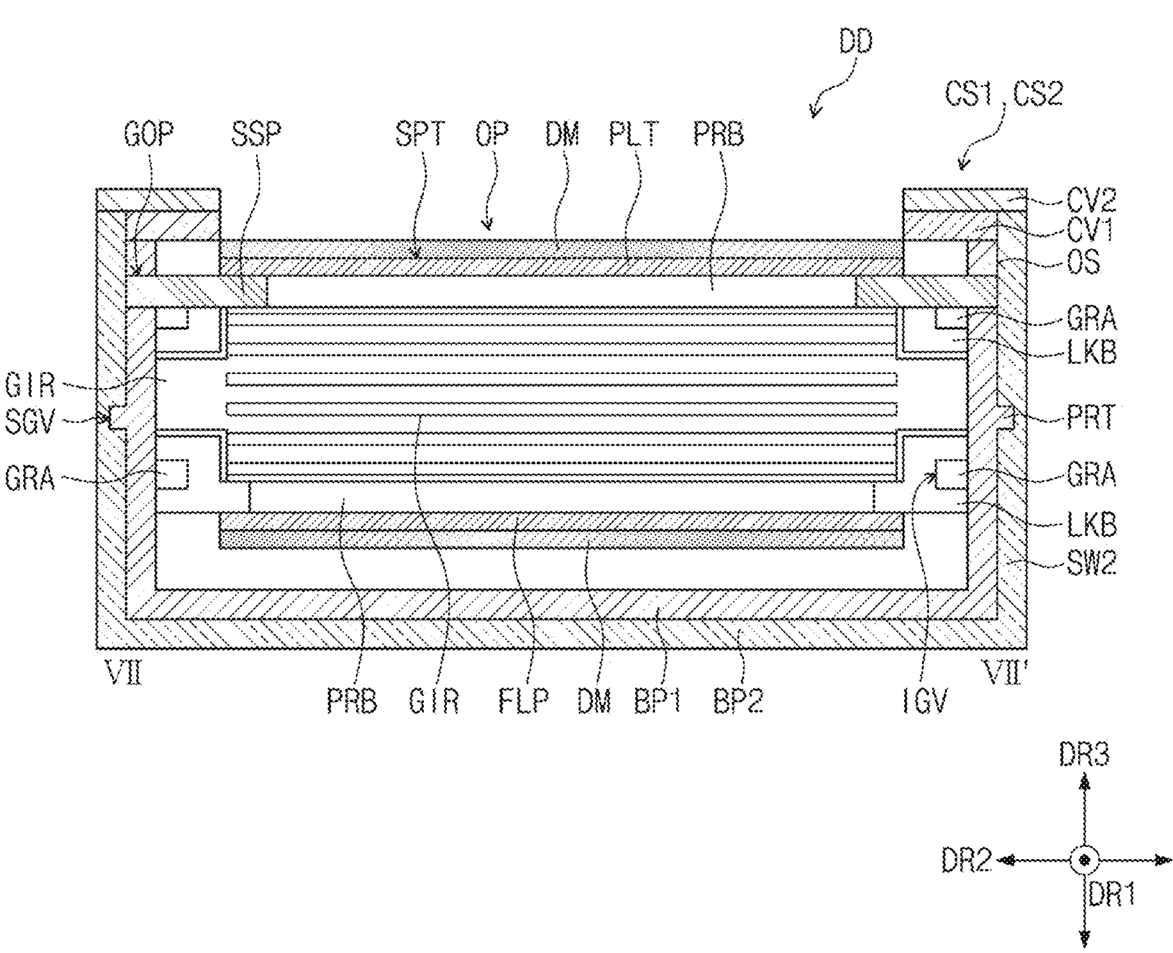
FIG. 24 is a cross-sectional view taken along line VII-VII' illustrated in FIG. 18.

FIG. 24 is a cross-sectional view taken along line VII-VII' illustrated in FIG. 18.

In FIG. 24, the support plate SPT and the display module DM accommodated in the first case CS1 are illustrated together with the first case CS1, and the first case CS1 and the second case CS2 are illustrated in a coupled state.

Referring to FIGS. 14, 18, and 24, the guide rails GRA disposed on the first inner surfaces IS1 may face each other in the second direction DR2. The sub-support parts SSP connected to the second inner surfaces IS2 may face each other in the second direction DR2.

The link bars LKB may be disposed on the opposite sides of the protruding bars PRB facing away from each other in the second direction DR2 and may be coupled to the guide rails GRA. The flat portion PLT may be disposed on the sub-support parts SSP connected to the second sidewalls SW2, and the sub-support parts SSP may support the flat portion PLT.

The support plate SPT may be disposed on the rear surface of the display module DM. In FIG. 24, the above-described first and second adhesive layers ADH1 and ADH2 are omitted. As the flexible portion FLP is coupled to the guide rails GRA by the link bars LKB and the flat portion PLT is supported by the sub-support parts SSP, the support plate SPT may easily support the display module DM.

The first covers CV1 may be disposed on the first sidewalls SW1. The first covers CV1 may extend in the second direction DR2 on the first sidewalls SW1. The first covers CV1, in the plan view, may overlap the link bars LKB protruding outward from the support plate SPT. As the first covers CV1 cover the link bars LKB, the link bars LKB may not be visible from the outside.

The second covers CV2 may be disposed on the second sidewalls SW2 and the first covers CV1. The second covers CV2, in the plan view, may overlap the link bars LKB. As the second covers CV2 cover the link bars LKB, the link bars LKB may not be visible from the outside.

The display module DM may be exposed to the outside through the opening OP defined between the first covers CV1 and between the second covers CV2.

Figure 25:
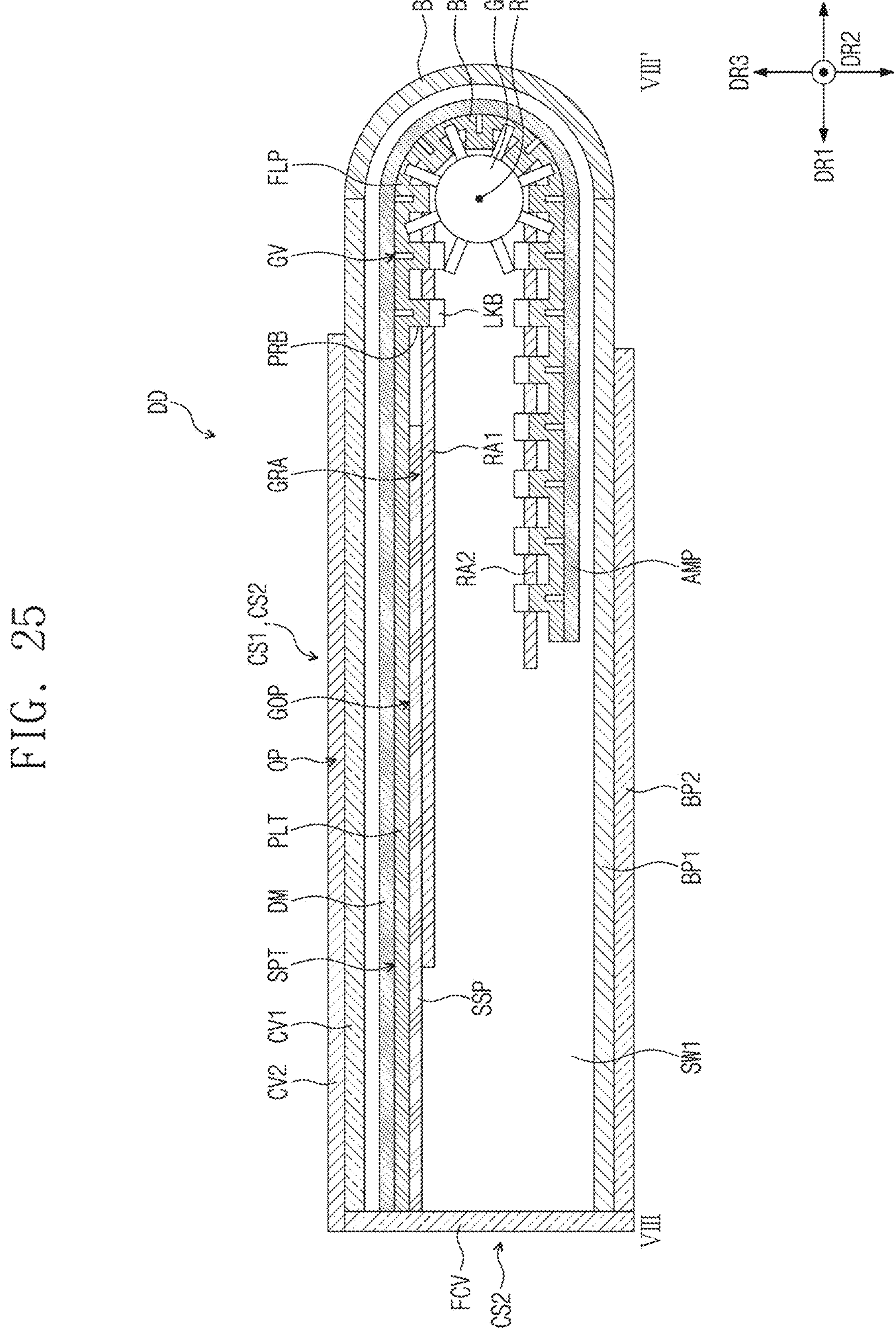
FIG. 25 is a cross-sectional view taken along line VIII-VIII' illustrated in FIG. 18, where
Figure 26:
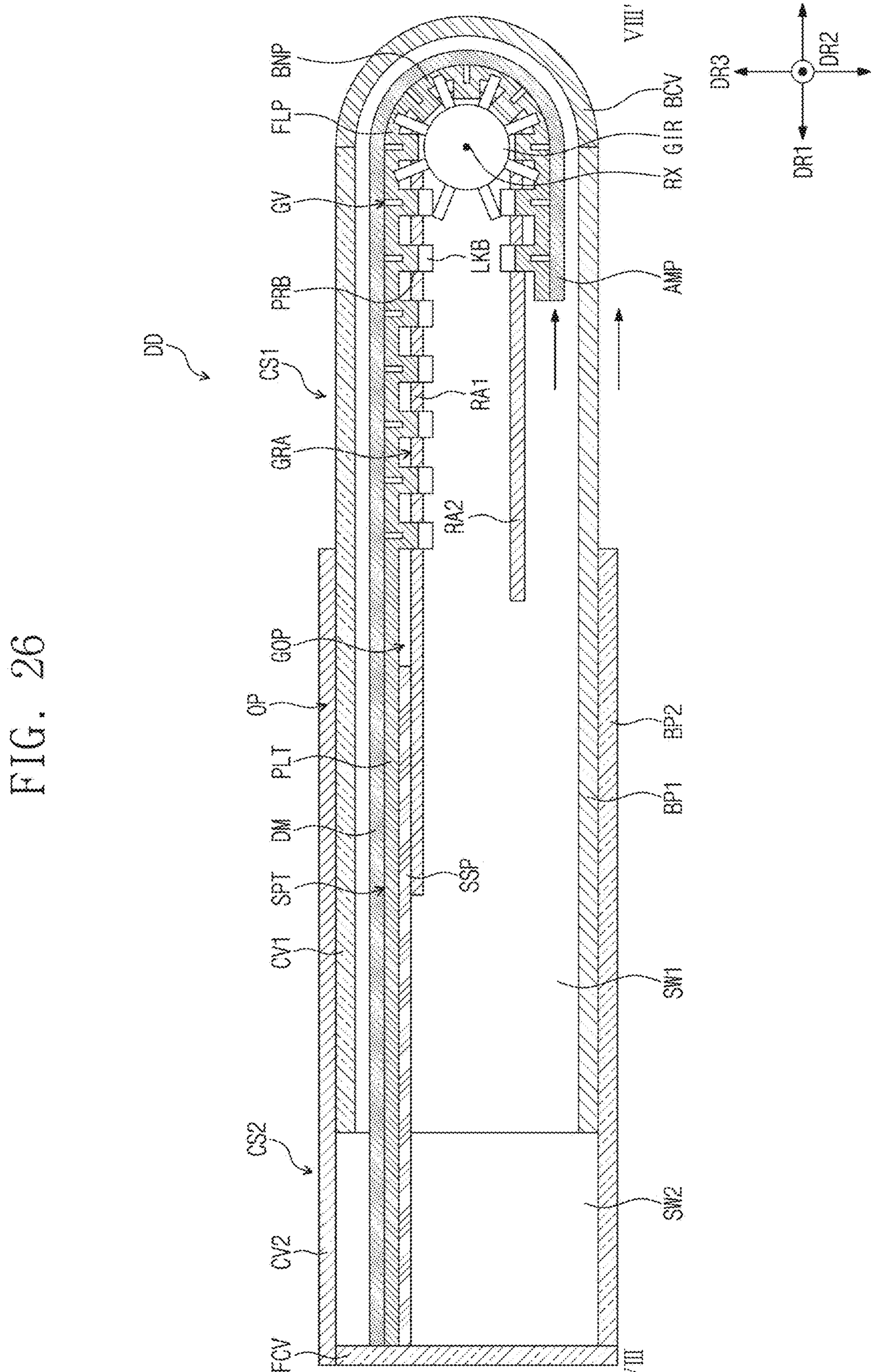
FIG. 26 is a cross-sectional view taken along line VIII-VIII' illustrated in FIG. 18, where

FIG. 25 is a cross-sectional view taken along line VIII-VIII' illustrated in FIG. 18, where FIG. 25 illustrates the default mode of the display device illustrated in FIG. 1. FIG. 26 is a cross-sectional view taken along line VIII-VIII' illustrated in FIG. 18, where FIG. 26 illustrates the extended mode of the display device illustrated in FIG. 2.

In FIGS. 25 and 26, the display module DM and the support plate SPT accommodated in the case CS are illustrated together with the case CS. Furthermore, the above-described first and second adhesive layers ADH1 and ADH2 are omitted in FIGS. 25 and 26.

Referring to FIGS. 1 and 25, the display module DM may be disposed on the support plate SPT. The support plate SPT may be folded and accommodated in the case CS. The flat portion PLT may support the display module DM. The flexible portion FLP may be easily bent together with the display module DM.

The flat portion PLT may be disposed on the sub-support part SSP, and the flexible portion FLP may be folded and coupled to the guide rail GRA. As the link bars LKB are arranged in the shape of the guide rail GRA and coupled to the guide rail GRA, the flexible portion FLP may also be disposed in the shape of the guide rail GRA.

The flexible portion FLP more flexible than the flat portion PLT may be more easily bent and disposed along the guide rail GRA. As the grooves GV are defined in the flexible portion FLP as described above, the flexible portion FLP may be easily bent. A folded portion of the flexible portion FLP may be defined as a bending portion BNP.

The gear GIR may be adjacent to the bending portion BNP. The gear GIR may be engaged with the protruding bars PRB that protrude from the bending portion BNP. In an embodiment, the protrusions of the gear GIR may be disposed between the protruding bars PRB that protrude from the bending portion BNP, for example. The gear GIR may rotate about the rotational axis RX to move the protruding bars PRB. Although not illustrated, an actuator for rotating the gear GIR may be disposed in the case CS.

The distances between lower portions of the protruding bars PRB arranged in a curved shape along the bending portion BNP may be smaller than the distances between lower portions of the protruding bars PRB arranged in the first direction DR1. When the protruding bars PRB are disposed too close to each other, an interference phenomenon in which the lower portions of the protruding bars PRB arranged in the curved shape contact each other may occur. To prevent this phenomenon, the gaps between the protruding bars PRB may be greater than the widths of the protruding bars PRB as described with reference to FIG. 12.

The display module DM and the support plate SPT may be accommodated in the first case CS1 and may be connected to the second case CS2. In an embodiment, one side of the display module DM and one side of the support plate SPT may be connected to the front part FCV. The display module DM and the support plate SPT may be connected and fixed to the front part FCV, for example. Accordingly, the display module DM and the support plate SPT connected to the front part FCV may move as the front part FCV moves.

The accommodated portion AMP of the display module DM described above may be disposed adjacent to the opposite side of the support plate SPT that faces away from the one side of the support plate SPT. Accordingly, the accommodated portion AMP may be disposed in the first case CS1 and may not be exposed to the outside.

In the default mode, the sub-support part SSP may be disposed in the guide opening GOP. An end of the first rail RA1 may be disposed under the sub-support part SSP. One end of the sub-support part SSP may be adjacent to the protruding bar PRB and the link bar LKB that are firstly disposed in the first rail RA1.

Referring to FIGS. 2 and 26, in the extended mode, the first case CS1 may move away from the second case CS2 in the first direction DR1. Accordingly, the display module DM and the support plate SPT may be extended to the outside. In the extended mode, the gear GIR may rotate about the rotational axis RX in the counterclockwise direction.

The link bars LKB may move along the guide rail GRA. The flexible portion FLP may move along the guide rail GRA depending on the movement of the link bars LKB. As the flexible portion FLP moves in the first direction DR1, part of the flexible portion FLP may be disposed flat.

The sub-support part SSP may move relative to the first case CS1 in the first direction DR1. The sub-support part SSP may be disposed in the guide opening GOP and may move in the first direction DR1 along the guide opening GOP. An end of the first rail RA1 may be disposed under the guide opening GOP. Referring to FIGS. 9, 10, and 26, in the extended mode, the sub-support part SSP may support the flat portion PLT and the display module DM disposed on the flat portion PLT. Furthermore, in the extended mode, the display module DM on the flexible portion FLP disposed flat may be supported by the protruding bars PRB horizontally arranged in the first direction DR1. Accordingly, in the extended mode, the display module DM may be easily supported by the sub-support part SSP and the protruding bars PRB adjacent to each other.

The protruding bars PRB may extend in the second direction DR2 and may support the display module DM on the flexible portion FLP disposed flat. That is, even though the flexible portion FLP is disposed flat, the protruding bars PRB extending in the second direction DR2 may easily support the display module DM disposed flat on the flexible portion FLP. In the extended mode, some of the protruding bars PRB may overlap the guide opening GOP.

As the area of the display module DM exposed to the outside in the extended mode is expanded, the area of the display surface DS exposed to the outside may be expanded. When the display device is changed from the extended mode to the default mode, the front part FCV and the first case CS1 illustrated in FIG. 26 move toward each other in the first direction DR1. Accordingly, the default mode illustrated in FIG. 25 may be performed. In the default mode, the gear GIR may rotate about the rotational axis RX in the clockwise direction.

In an embodiment of the disclosure, the grooves GV may be formed on the flexible portion FLP of the support plate SPT, and the protruding bars PRB overlapping the grooves GV may protrude downward from the flexible portion FLP and may extend in the second direction DR2. The flexible portion FLP may be easily folded together with the display module DM by the grooves GV, and the display module DM may be easily supported by the protruding bars PRB.

In addition, without the use of separate support bars under the support plate SPT, the protruding bars PRB corresponding to the support bars may be unitary with the flexible portion FLP and may replace the function of the support bars. Accordingly, a support structure supporting the display module DM may be made light since the support bars are omitted.

Figure 27:
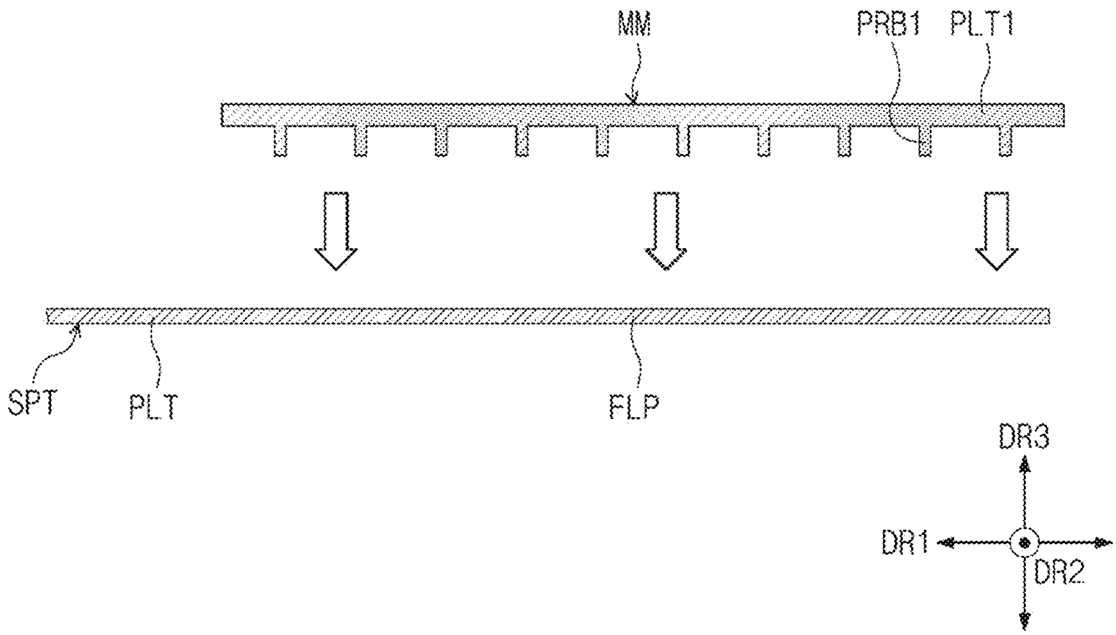
FIGS. 27 to 29 are views for describing an embodiment of a manufacturing method of the support plate according to the disclosure.
Figure 28:
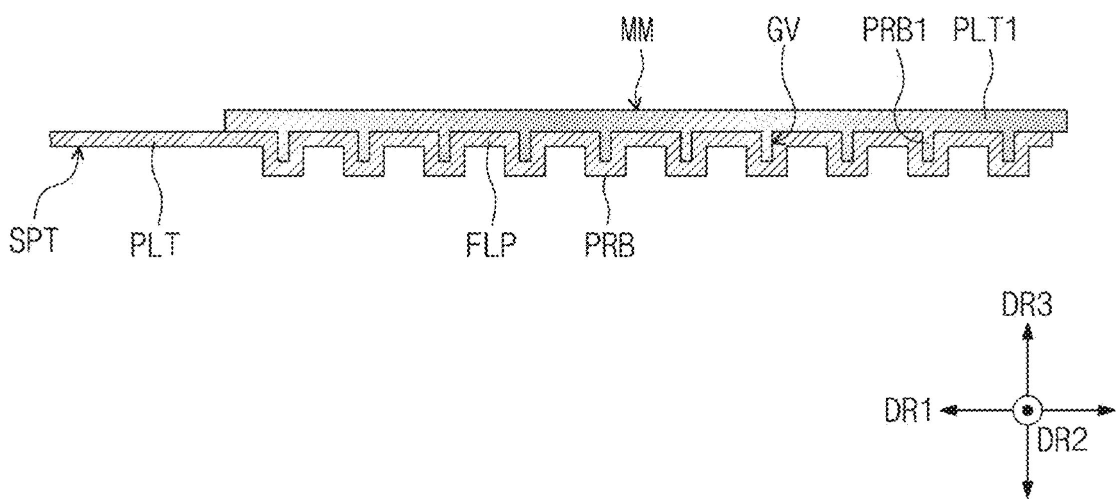
Figure 29:
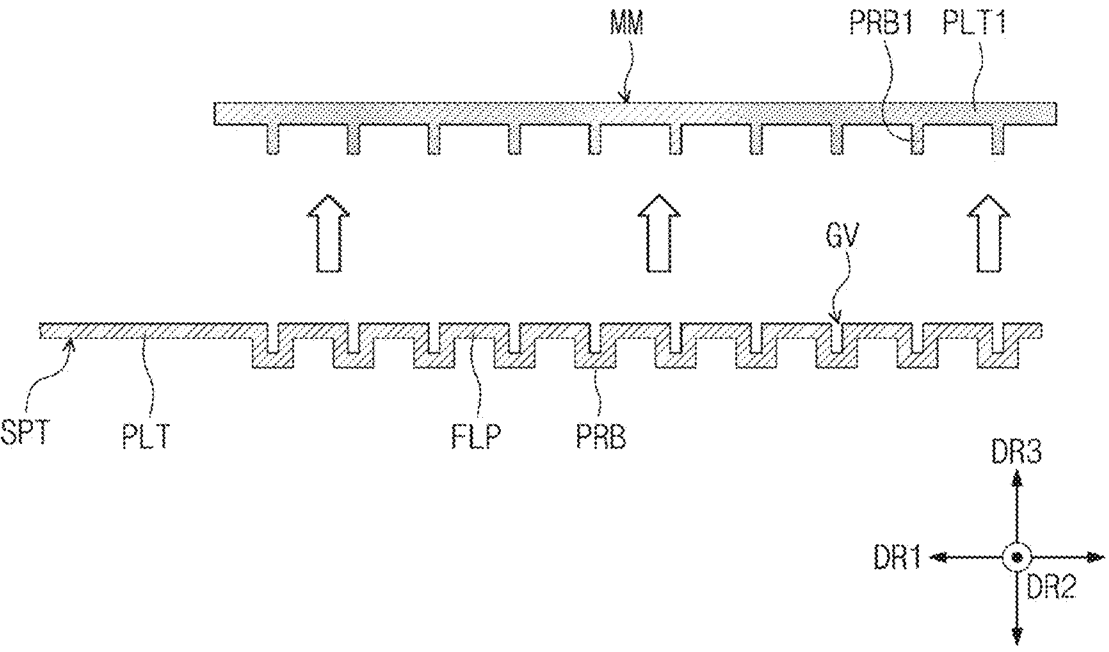

FIGS. 27 to 29 are views for describing an embodiment of a manufacturing method of the support plate according to the disclosure.

In FIGS. 27 to 29, sections of the support plate SPT viewed in the second direction DR2 are illustrated.

Referring to FIG. 27, the support plate SPT may include the flat portion PLT and the flexible portion FLP. However, since the flexible portion FLP is in a state before the above-described protruding bars PRB are formed, the flexible portion FLP may be in a flat state together with the flat portion PLT.

A mold MM may be disposed on the support plate SPT. The mold MM may be disposed on the flexible portion FLP. The mold MM may include a flat portion PLT1 and a plurality of protruding bars PRB1 protruding downward from the flat portion PLT1. The protruding bars PRB1 may have a shape corresponding to the above-described grooves GV. The protruding bars PRB1 may be arranged in the first direction DR1 and may extend in the second direction DR2.

Referring to FIG. 28, the mold MM may move toward the flexible portion FLP and may press the flexible portion FLP. The protruding bars PRB1 may press the flexible portion FLP. As the protruding bars PRB1 press the flexible portion FLP, the grooves GV may be formed on the upper surface of the flexible portion FLP.

As the protruding bars PRB1 press the flexible portion FLP, portions of the flexible portion FLP may protrude downward. Accordingly, while the grooves GV are formed, the portions of the flexible portion FLP that overlap the grooves GV may protrude downward, and thus the protruding bars PRB may be formed.

Referring to FIG. 29, the mold MM may move upward and may be separated from the flexible portion FLP. According to the process, the support plate SPT may include the flat portion PLT having a flat plate shape, the flexible portion FLP in which the grooves GV are defined, and the protruding bars PRB protruding downward from the flexible portion FLP.

Figures 30A, 30B:
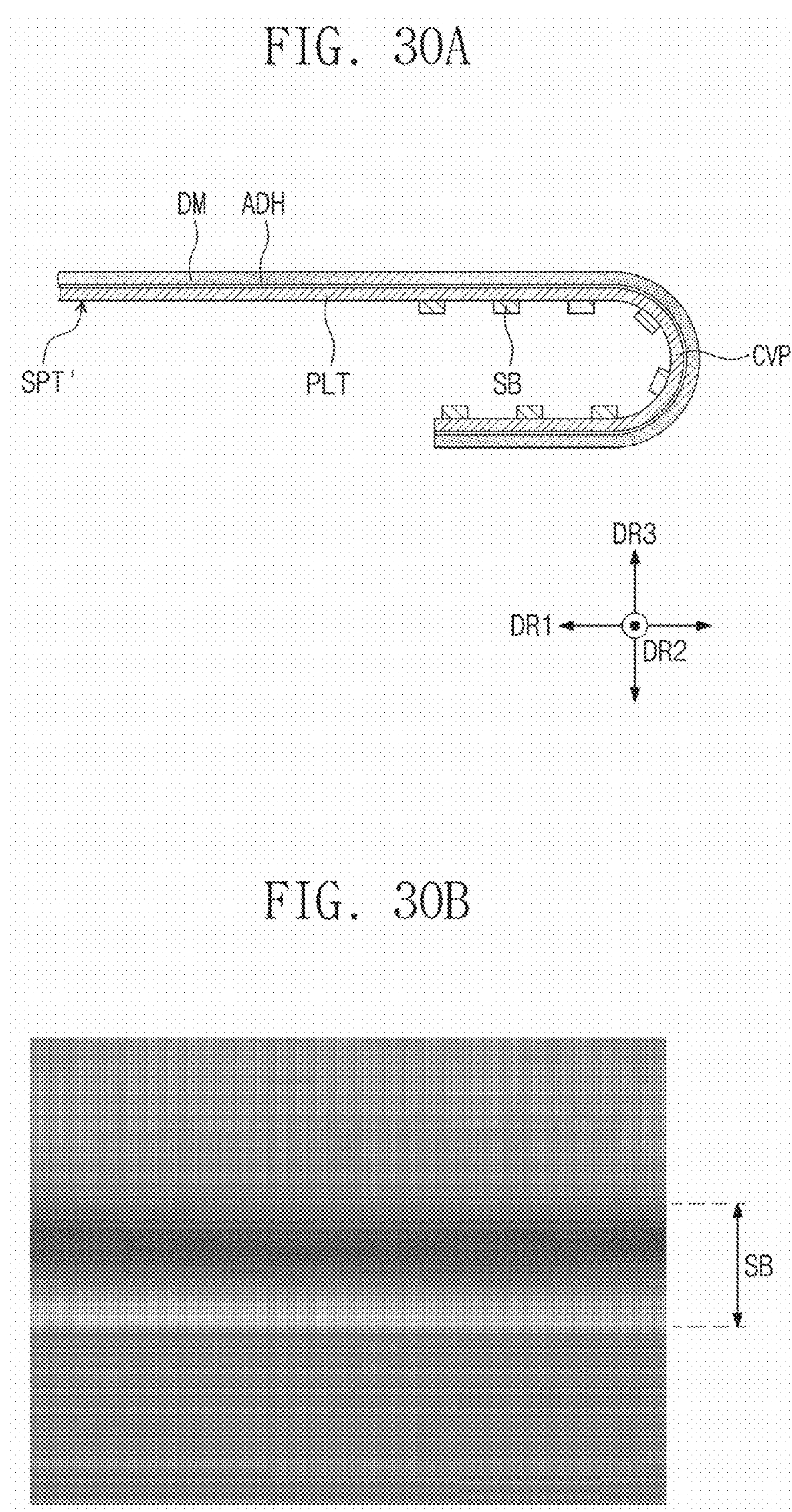
FIG. 30A is a view illustrating a configuration of a comparative support plate including support bars.
FIG. 30B is a microscope image of the display module taken from above the display module when separate support bars are disposed under the display module.

In FIG. 30A, a configuration of a comparative support plate SPT' including support bars SB is illustrated, and in FIGS. 30B, 30C, 31A, 31B, 32A, and 32B, portions of the display module DM that overlap one support bar SB and one protruding bar PRB and deformed states of portions of the display module DM around the one support bar SB and the one protruding bar PRB are illustrated. Furthermore, in FIGS. 30B, 30C, 31A, 31B, 32A, and 32B, the reference character SB and the reference character PRB may indicate the positions in which the support bar SB and the protruding bar PRB are disposed.

FIG. 30A is a view illustrating the configuration of the comparative support plate including the support bars.

Referring to FIG. 30A, the comparative support plate SPT' may include a flat portion PLT and a curved portion CVP that extends from the flat portion PLT and that is folded. The curved portion CVP may correspond to the above-described flexible portion FLP. The display module DM may be disposed on the comparative support plate SPT', and an adhesive layer ADH may be disposed between the display module DM and the comparative support plate SPT'. The display module DM and the comparative support plate SPT' may be bonded to each other by the adhesive layer ADH.

The plurality of support bars SB may be disposed on a rear surface of the curved portion CVP. The support bars SB may be separately manufactured and may be connected to the curved portion CVP. In an embodiment, the support bars SB may include or consist of a metal, such as stainless steel, and may be connected to the curved portion CVP by a welding process, for example. The support bars SB may extend in the second direction DR2 and may be arranged in the first direction DR1.

Figure 30C:
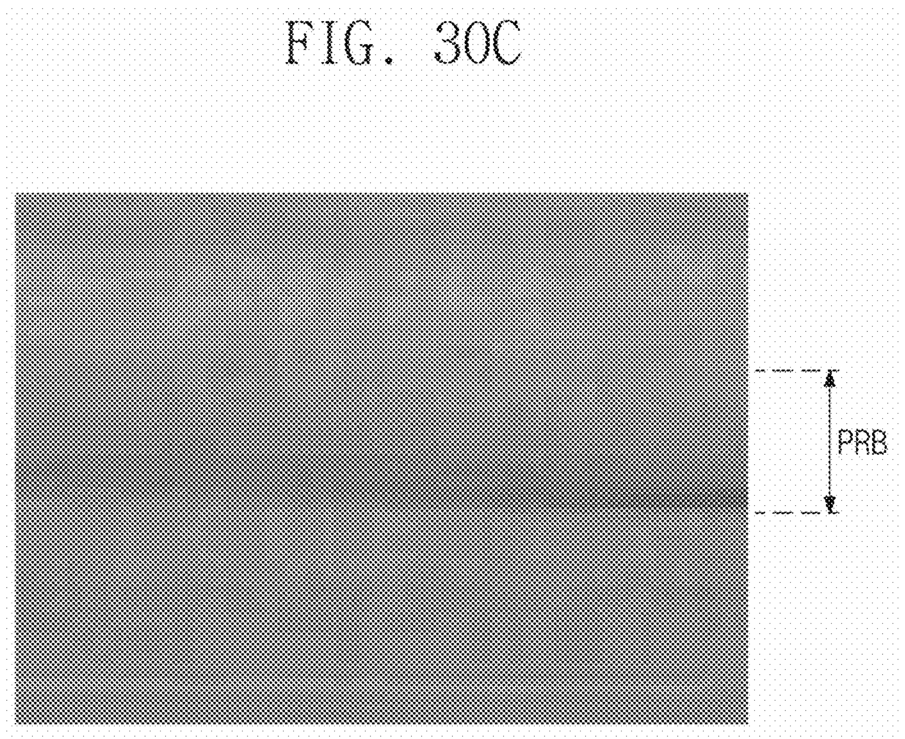
FIG. 30C is a microscope image of an embodiment of the display module taken from above the display module when protruding bars of the support plate according to the disclosure are disposed under the display module.

FIG. 30B is a microscope image of the display module taken from above the display module when separate support bars are disposed under the display module. FIG. 30C is a microscope image of the display module taken from above the display module when the protruding bars of the support plate in an embodiment of the disclosure are disposed under the display module.

Referring to FIGS. 30B and 30C, the support bar SB disposed under the display module DM may be more visually recognized. When the protruding bar PRB unitary with the flexible portion FLP is disposed under the display module DM, the protruding bar PRB may be less visible than the support bar SB.

Accordingly, when the separate support bars SB are disposed under the display module DM and the display module DM is viewed from above the display module DM, the support bars SB may be more visually recognized in a corrugated shape. When the protruding bars PRB unitary with the flexible portion FLP are disposed under the display module DM and the display module DM is viewed from above the display module DM, the protruding bars PRB may not be visible to the user in a corrugated shape.

FIG. 31A is a graph depicting a deformed state of the display module when the separate support bars are disposed under the display module. FIG. 31B is a graph depicting an embodiment of a deformed state of the display module when the protruding bars of the support plate according to the disclosure are disposed under the display module.

FIGS. 31A and 31B are graphs depicting the measured deformed states of the display module DM after the default mode and the extended mode described above are repeated 100,000 times.

Referring to FIGS. 31A and 31B, the maximum deformation MAX may indicate a state in which a portion of the display module DM is maximally deformed upward based on a flat state. The minimum deformation MIN may indicate a state in which the portion of the display module DM is maximally deformed downward based on the flat state. The flat state may be expressed as a value of 0 (zero), the maximum deformation MAX may be expressed as a micrometer value more than 0 (zero), and the minimum deformation MIN may be expressed as a micrometer value less than 0 (zero).

As the difference between the maximum deformation MAX and the minimum deformation MIN is increased, the amount of deformation of the display module DM may be increased. The difference between the maximum deformation MAX and the minimum deformation MIN of the display module DM according to the support bar SB may be greater than the difference between the maximum deformation MAX and the minimum deformation MIN of the display module DM according to the protruding bar PRB.

The maximum deformation MAX and the minimum deformation MIN of the display module DM according to the support bar SB were measured to be 43.79 micrometers (μm) and −29.61 micrometers (μm), respectively. The maximum deformation MAX and the minimum deformation MIN of the display module DM according to the protruding bar PRB were measured to be 33.79 micrometers (μm) and 16.61 micrometers (μm), respectively.

The difference between the maximum deformation MAX and the minimum deformation MIN of the display module DM according to the support bar SB may be 73.4 micrometers (μm). The difference between the maximum deformation MAX and the minimum deformation MIN of the display module DM according to the protruding bar PRB may be 50.4 micrometers (μm).

Accordingly, when the protruding bars PRB unitary with the flexible portion FLP are disposed under the display module DM, the amount of deformation of the display module DM may be less than when the separate support bars SB are disposed under the display module DM.

Figures 32A, 32B:
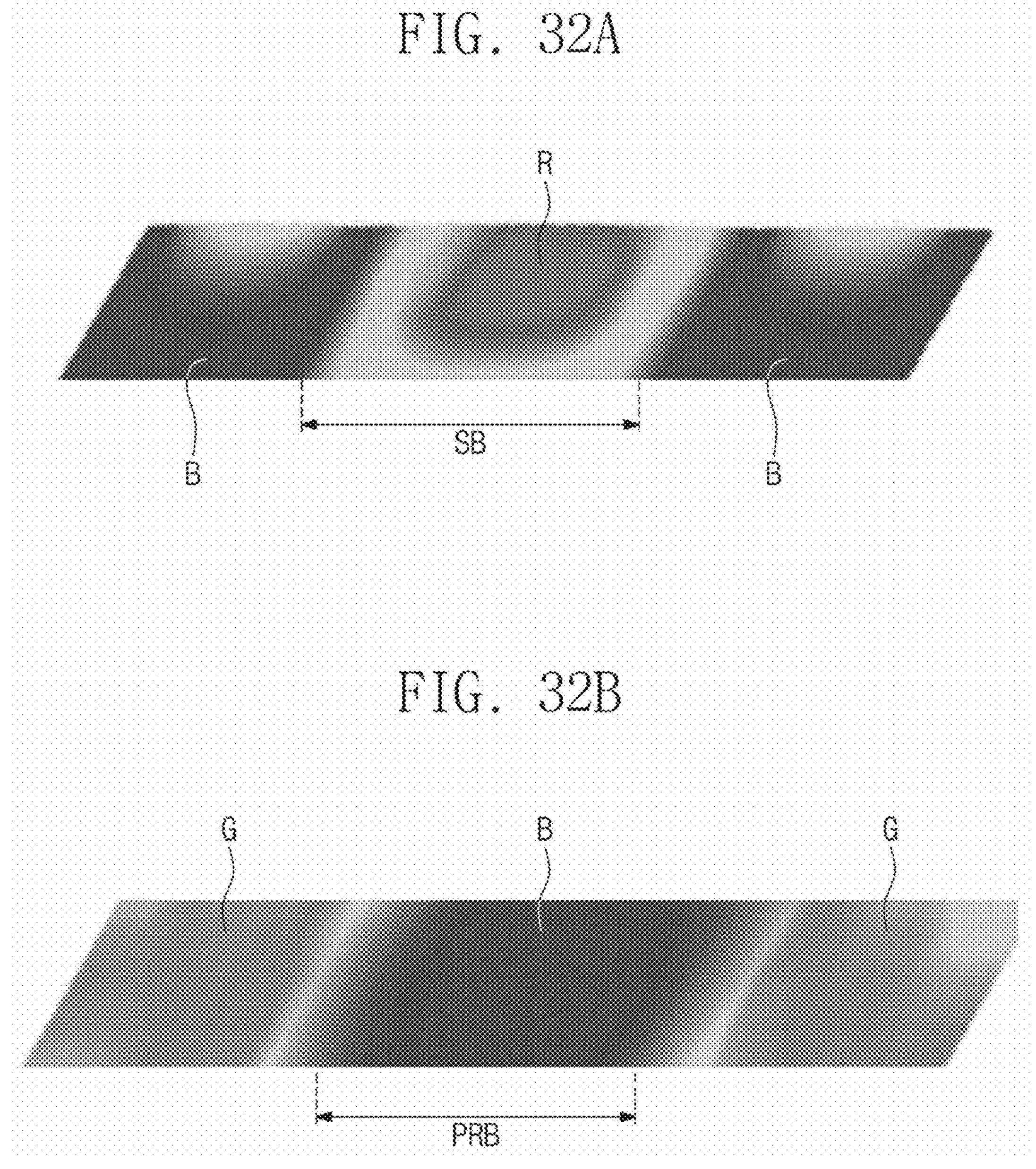
FIG. 32A is a view illustrating a deformed state of the display module in a plan view when the separate support bars are disposed under the display module.
FIG. 32B is a view illustrating an embodiment of a deformed state of the display module in a plan view when the protruding bars of the support plate according to the disclosure are disposed under the display module.

FIG. 32A is a view illustrating a deformed state of the display module in a plan view when the separate support bars are disposed under the display module. FIG. 32B is a view illustrating an embodiment of a deformed state of the display module in a plan view when the protruding bars of the support plate according to the disclosure are disposed under the display module.

FIGS. 32A and 32B illustrate measurements taken under experimental conditions different from those in FIGS. 31A and 31B. In an embodiment, FIGS. 32A and 32B are views obtained by measuring deformed states of the display modules DM after the display module having the support bars SB disposed thereon and the display module DM having the protruding bars PRB disposed thereon are exposed at an environment of −5 degrees Celsius (° C.) for 250 hours, for example.

In FIGS. 32A and 32B, reference characters R, G, and B represent colors. Red (R), blue (B), and green (G) represent the amount of deformation of the display module DM. The amount of deformation may be larger in the order of red (R)>blue (B)>green (G).

When the support bar SB is disposed under the display module DM, the display module DM over the support bar SB is represented in red (R), and the display module DM around the support bar SB is represented in blue (B). When the protruding bar PRB is disposed under the display module DM, the display module DM over the protruding bar PRB is represented in blue (B), and the display module DM around the protruding bar PRB is represented in green (G).

Accordingly, when the protruding bars PRB unitary with the flexible portion FLP are disposed under the display module DM, the amount of deformation of the display module DM may be less than when the separate support bars SB are disposed under the display module DM.

In the experimental results of FIGS. 32A and 32B, the amount of deformation of the display module DM according to the support bar SB was measured to be 1.5 millimeters (mm), and the amount of deformation of the display module DM according to the protruding bar PRB was measured to be 0.45 millimeters (mm). The amount of deformation in FIGS. 32A and 32B may be the difference between the maximum deformation and the minimum deformation as in FIGS. 31A and 31B.

FIGS. 33 to 38 are views illustrating support plates according to various embodiments of the disclosure.

Figure 33:
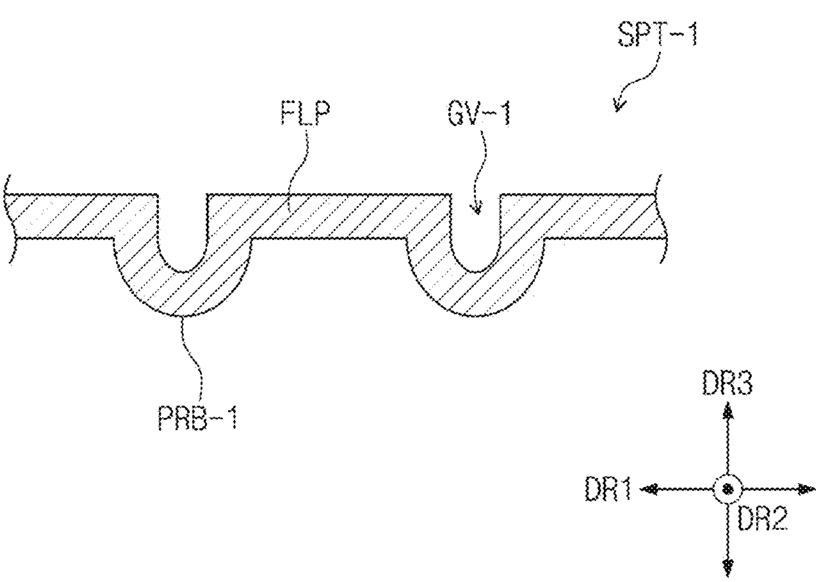
FIGS. 33 to 38 are views illustrating support plates according to various embodiments of the disclosure.
Figure 34:
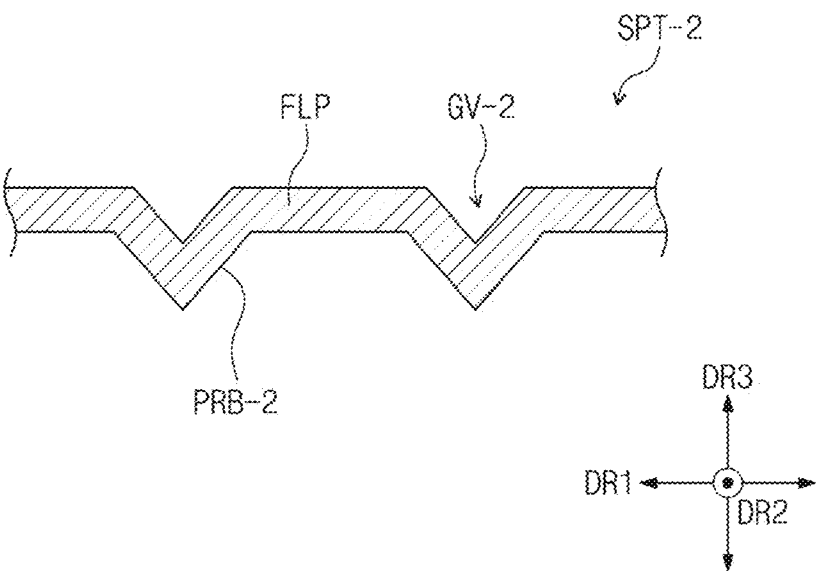

FIGS. 33 and 34 illustrate sections corresponding to FIG. 12, and FIGS. 35 to 38 illustrate perspective views corresponding to FIG. 10 or 11.

Hereinafter, descriptions of configurations of support plates SPT-1 to SPT-6 illustrated in FIGS. 33 to 39 will be focused on components different from those of the support plate SPT described above.

Referring to FIG. 33, grooves GV-1 may be defined in an upper surface of a flexible portion FLP of the support plate SPT-1. The support plate SPT-1 may include protruding bars PRB-1 that protrude downward from the flexible portion FLP. The grooves GV-1 may have a concave curved shape, and the protruding bars PRB-1 may have a convex curved shape.

Referring to FIG. 34, grooves GV-2 may be defined in an upper surface of a flexible portion FLP of the support plate SPT-2, and the support plate SPT-2 may include protruding bars PRB-2 that protrude downward from the flexible portion FLP. The grooves GV-2 may have a shape corresponding to two sides of an inverted triangle facing downward. The protruding bars PRB-2 may have an inclined surface and may have a shape corresponding to two sides of an inverted triangle facing downward.

Figure 35:
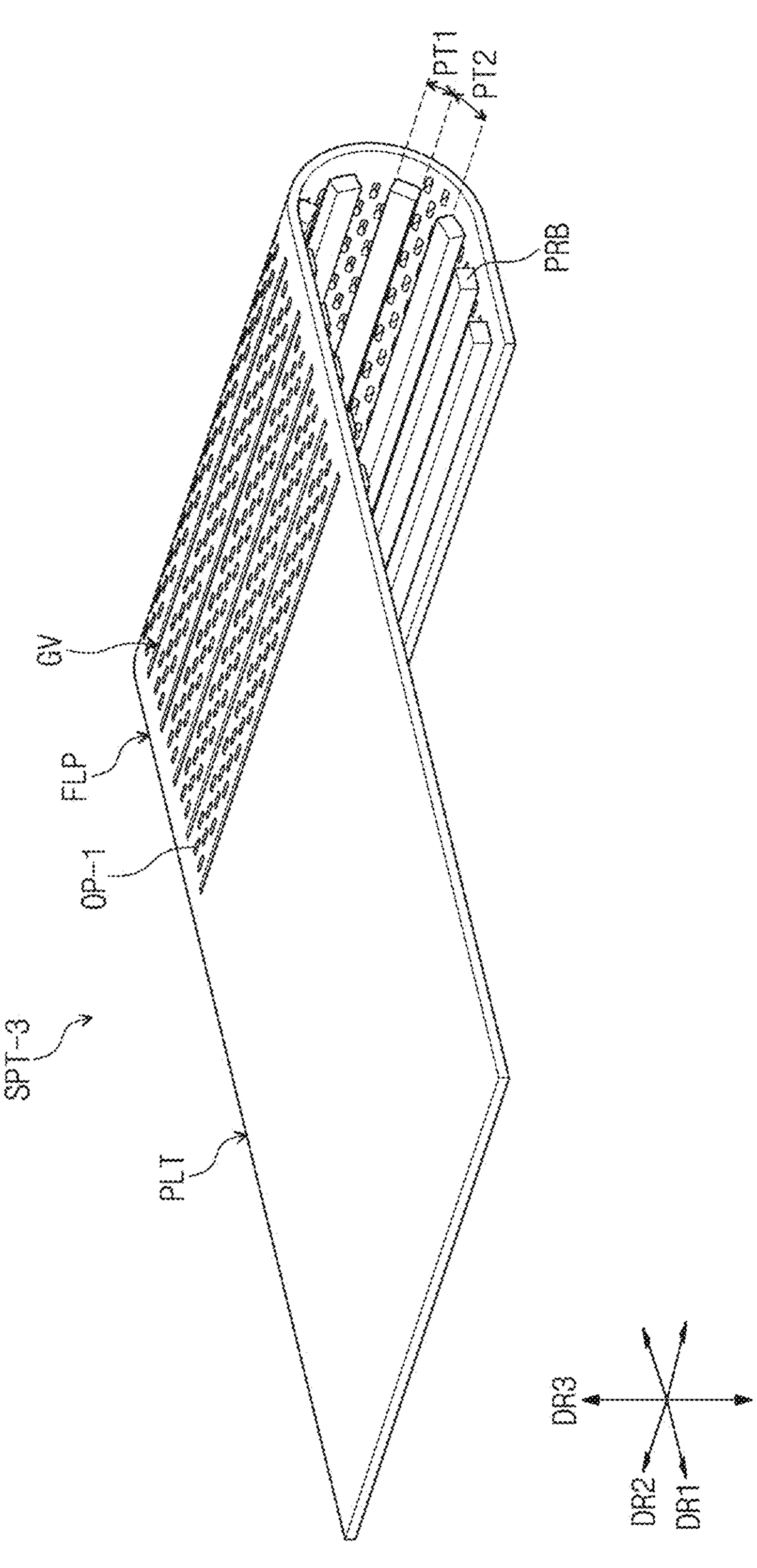

Referring to FIG. 35, grooves GV may be defined in a flexible portion FLP of the support plate SPT-3 and may include a plurality of first portions PT1 overlapping protruding bars PRB and a plurality of second portions PT2 between the first portions PT1.

A plurality of openings OP-1 may be defined in the second portions PT2. The openings OP-1 may be arranged in the first direction DR1 and the second direction DR2. The openings OP-1 disposed in the $h^{th}$ column and the openings OP-1 disposed in the $(h+1)^{th}$ column may be staggered with respect to each other. Here, "h" is a natural number. As the openings OP-1 are additionally defined in the flexible portion FLP, the flexible portion FLP may be more flexible.

Figure 36:
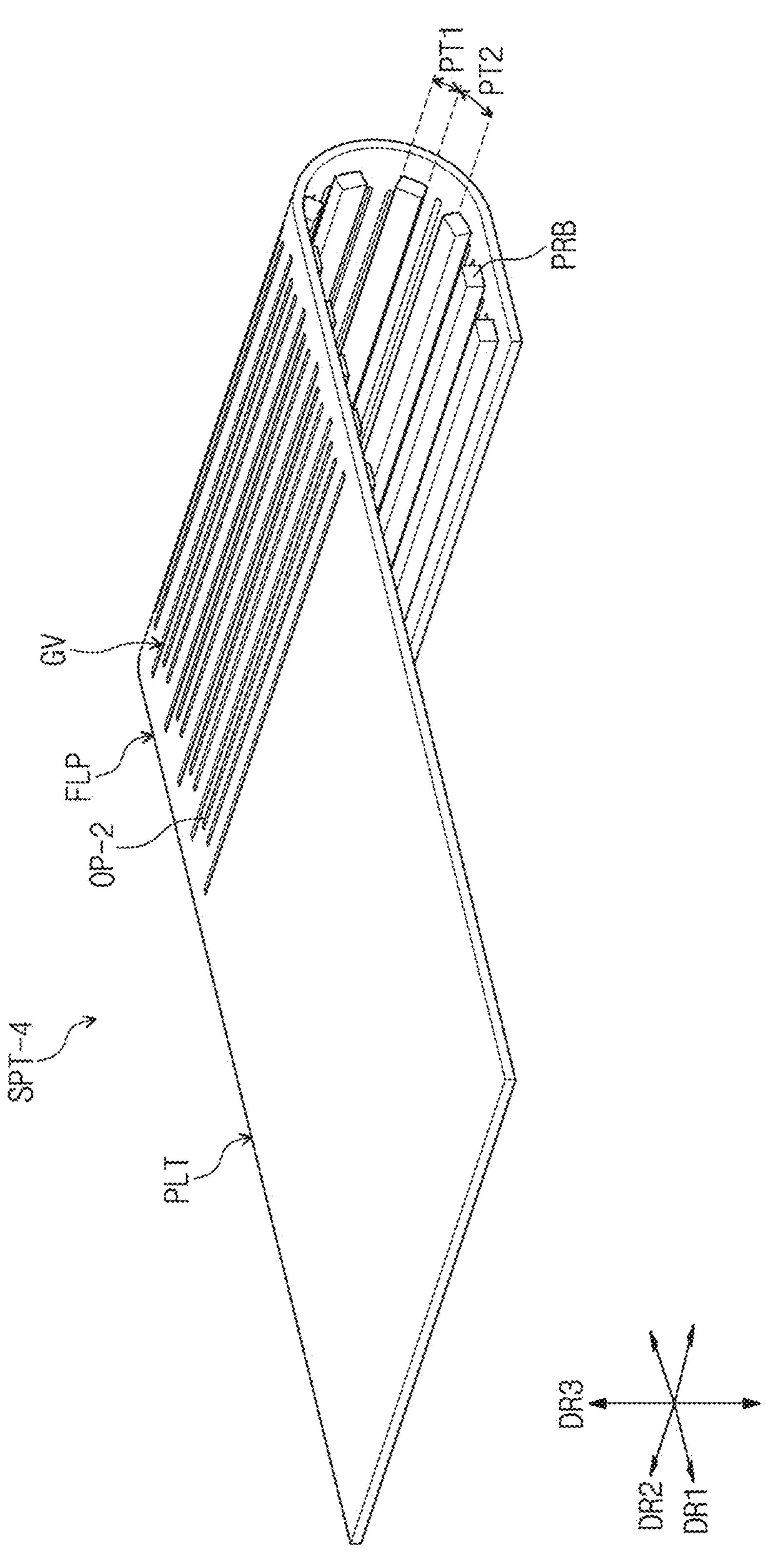

Referring to FIG. 36, likewise to the support plate SPT-3, the support plate SPT-4 may include first portions PT1 and second portions PT2 between the first portions PT1. A plurality of openings OP-2 may be defined in the second portions PT2. The openings OP-2 may extend in the second direction DR2 and may be arranged in the first direction DR1.

Figure 37:
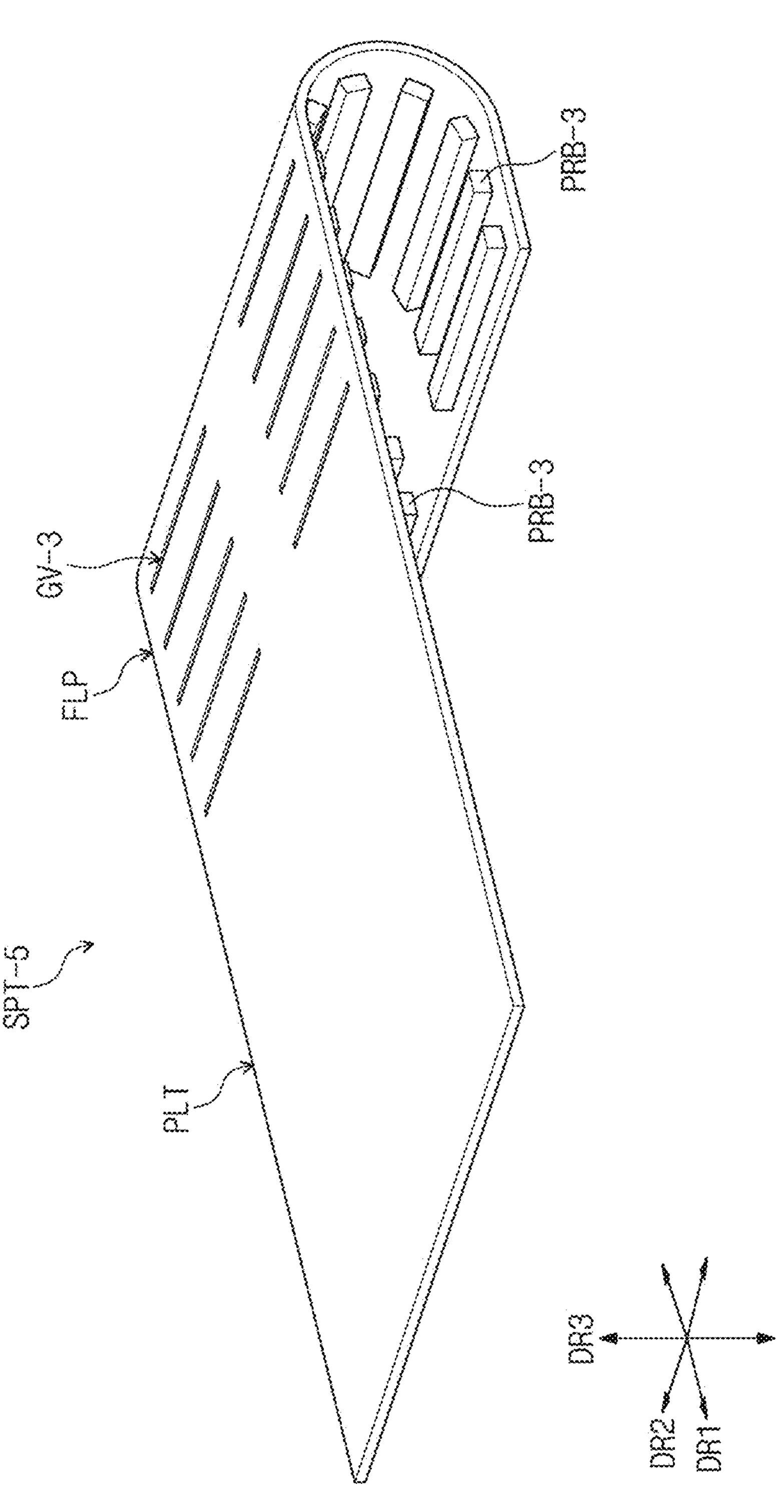

Referring to FIG. 37, a plurality of grooves GV-3 defined in a flexible portion FLP of the support plate SPT-5 may be arranged in the second direction DR2. Although two grooves GV-3 are arranged in the second direction DR2, more grooves GV-3 may be arranged in the second direction DR2. Depending on the arrangement of the grooves GV-3, a plurality of protruding bars PRB-3 protruding from the flexible portion FLP may also be arranged in the second direction DR2.

Figure 38:
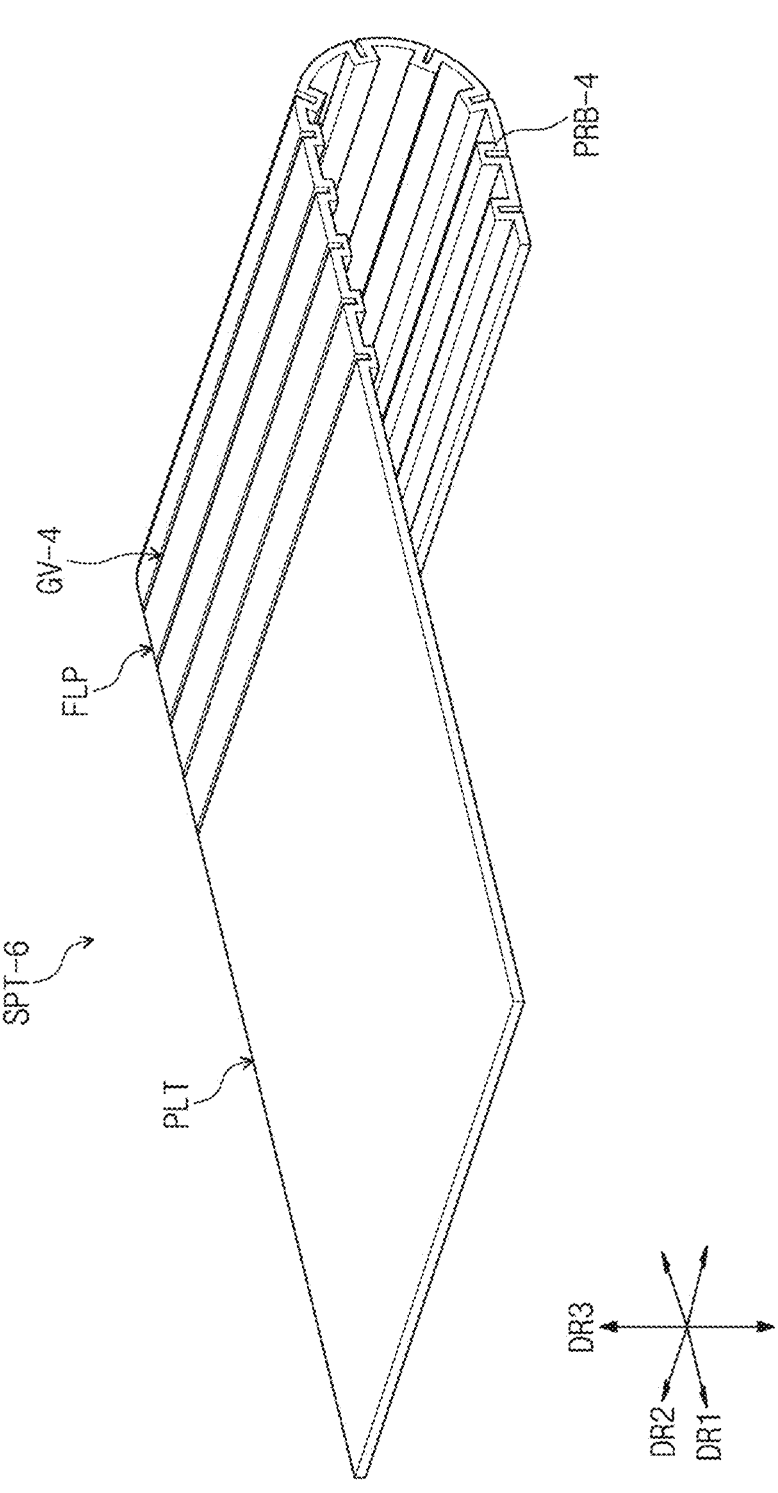

Referring to FIG. 38, unlike in the above-described support plate SPT, grooves GV-4 defined in a flexible portion FLP of the support plate SPT-6 and protruding bars PRB-4 protruding from the flexible portion FLP may extend to opposite sides of the flexible portion FLP opposite to each other in the second direction DR2.

By the embodiments of the disclosure, the grooves may be formed on the flexible portion of the support plate, and the protruding bars overlapping the grooves may protrude downward from the flexible portion. The flexible portion may be easily folded together with the display module by the grooves, and the display module may be easily supported by the protruding bars.

In addition, without the use of separate support bars, the protruding bars corresponding to the support bars may be unitary with the flexible portion and may replace the function of the support bars. Accordingly, the support bars may be omitted, and thus the support structure supporting the display module may be made lighter.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A display device comprising:
- a display module; and
- a support plate disposed under the display module, the support plate including:
  - a flat portion;
  - a flexible portion which extends from the flat portion and is folded, a portion of the flexible portion being disposed under the flat portion; and
  - a plurality of protruding bars which are unitary with the flexible portion and protrude downward from the flexible portion,
- wherein a plurality of grooves is defined in an upper surface of the flexible portion and overlaps the plurality of protruding bars,
- wherein the plurality of protruding bars is arranged in a first direction and extends in a second direction crossing the first direction, and the flexible portion is folded about a rotational axis extending in the second direction, and
- wherein in the first direction, each of the plurality of protruding bars has a width smaller than a distance between protruding bars adjacent to each other.

2. The display device of claim 1, wherein the flexible portion is more flexible than the flat portion.

3. The display device of claim 1, wherein the plurality of protruding bars is spaced apart from opposite sides of the flexible portion opposite to each other in the second direction.

4. The display device of claim 1, wherein each of the plurality of protruding bars has a greater thickness than a thickness of the flexible portion in a third direction perpendicular to a plane defined by the first and second directions.

5. The display device of claim 4, wherein in the third direction, each of the plurality of grooves has a depth equal to the thickness of each of the plurality of protruding bars.

6. The display device of claim 1, further comprising:
- a gear adjacent to a bending portion defined as a folded portion of the flexible portion and engaged with protruding bars which protrude from the bending portion among the plurality of protruding bars, and
- the gear rotates about the rotational axis.

7. The display device of claim 1, further comprising:
- a plurality of link bars disposed on opposite sides of the plurality of protruding bars opposite to each other in the second direction.

8. The display device of claim 7, wherein the plurality of link bars protrudes outward from the flexible portion.

9. The display device of claim 8, further comprising:
- a first case which accommodates the display module and the support plate;
- guide rails disposed on inner surfaces of the first case, the inner surfaces facing each other in the second direction; and
- a second case connected to the display module and the support plate and coupled to the first case,
- wherein the first case moves toward or away from the second case in the first direction, and the plurality of link bars is coupled to the guide rails and moves along the guide rails.

10. The display device of claim 9, wherein insertion grooves are defined in sides of the plurality of link bars which face toward the outside, and the guide rails are disposed in the insertion grooves.

11. The display device of claim 9, wherein each of the guide rails includes:
- a first rail which extends in the first direction;
- a second rail which extends in the first direction and disposed under the first rail; and
- a curved rail which extends from one side of the first rail to one side of the second rail.

12. The display device of claim 1, further comprising:
- a first adhesive layer disposed between the display module and the flat portion; and
- a second adhesive layer disposed between the display module and the flexible portion, the second adhesive layer having a modulus different from a modulus of the first adhesive layer.

13. The display device of claim 12, wherein the second adhesive layer has a lower modulus than a modulus of the first adhesive layer.

14. The display device of claim 1, wherein the plurality of grooves extends into the plurality of protruding bars.

15. The display device of claim 1, wherein the flexible portion includes:

a plurality of first portions in which the plurality of grooves is defined, the plurality of first portions overlapping the plurality of protruding bars; and a plurality of second portions between the plurality of first portions, and wherein openings are defined in the plurality of second portions.

16. The display device of claim 1, wherein the plurality of grooves and the plurality of protruding bars extend to opposite sides of the flexible portion.

17. A display device comprising:

a display module; and a support plate disposed under the display module, the support plate including:

a flat portion;

a flexible portion which extends from the flat portion and folded about a rotational axis extending in a second direction, a portion of the flexible portion being disposed under the flat portion;

a plurality of protruding bars which are unitary with the flexible portion and protrude downward from the flexible portion and extend in the second direction; and a plurality of link bars disposed on opposite sides of the plurality of protruding bars opposite to each other in the second direction, wherein the plurality of protruding bars is arranged in a first direction crossing the second direction, and in the first direction, each of the plurality of protruding bars has a width smaller than a distance between protruding bars adjacent to each other.

18. A display device comprising:

a display module;

a support plate disposed under the display module; and a plurality of protruding bars which are unitary with a flexible portion of the support plate and protrude downward from the flexible portion of the support plate and overlap a plurality of grooves defined in an upper surface of the flexible portion of the support plate, wherein the plurality of grooves extends into the plurality of protruding bars, and wherein the plurality of protruding bars is arranged in a first direction and extends in a second direction crossing the first direction, and the flexible portion is folded about a rotational axis extending in the second direction, and in the first direction, each of the plurality of protruding bars has a width smaller than a distance between protruding bars adjacent to each other.

* * * * *